US008832000B2

(12) United States Patent
Jebara

(10) Patent No.: US 8,832,000 B2
(45) Date of Patent: Sep. 9, 2014

(54) SYSTEMS, DEVICE, AND METHODS FOR PARAMETER OPTIMIZATION

(75) Inventor: Tony Jebara, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 183 days.

(21) Appl. No.: 13/491,426

(22) Filed: Jun. 7, 2012

(65) Prior Publication Data

US 2012/0317060 A1 Dec. 13, 2012

Related U.S. Application Data

(60) Provisional application No. 61/494,281, filed on Jun. 7, 2011.

(51) Int. Cl.
*G06N 5/00* (2006.01)
*G06F 1/00* (2006.01)
*G06N 99/00* (2010.01)

(52) U.S. Cl.
CPC ................................ *G06N 99/005* (2013.01)
USPC ............................... 706/1; 716/103; 705/500

(58) Field of Classification Search
USPC ........................................................ 706/1
See application file for complete search history.

(56) References Cited

U.S. PATENT DOCUMENTS 6,556,960 B1 4/2003 Bishop et al.
7,444,309 B2 * 10/2008 Branke et al. ............... 706/13
7,689,419 B2 3/2010 Mahajan et al.
7,720,830 B2 5/2010 Wen et al.
2009/0083680 A1 * 3/2009 McConaghy et al. ......... 716/3

OTHER PUBLICATIONS

J. Darroch and D. Ratcliff. Generalized iterative scaling for log-linear models. Annals of Math. Stat., 43:1470-1480, 1972.
D. Bohning and B. Lindsay. Monotonicity of quadratic approxmiation algorithms. Ann. Inst. Statist. Math., 40:641-663, 1988.
Y. Mao and G. Lebanon. Generalized isotonic conditional random fields. Machine Learning, 77:225-248, 2009.
M. Wainwright and M Jordan. Graphical models, exponential families and variational inference. Foundations and Trends in Machine Learning, 1(1-2):1-305, 2008.
A. Quattoni, S.Wang, L. P. Morency, M. Collins, and T. Darrell. Hidden conditional random fields. IEEE PAMI, 29(10):1848-1852, Oct. 2007.
Y. Wang and G. Mori. Max-margin hidden conditional random fields for human action recognition. In CVPR, pp. 872-879. IEEE, 2009.

(Continued)

*Primary Examiner* — Alan Chen
*Assistant Examiner* — Kalpana Bharadwaj
(74) *Attorney, Agent, or Firm* — Miles & Stockbridge P.C.; Mark A. Catan

(57) ABSTRACT

A computerized method for optimizing parameters is described. A system can initialize a group of parameters to respective values within a set of allowable models and bound a partition function across a number of variable pairs to generate a plurality of bounds. The system can also determine new values for the group of parameters that minimize a sum of the plurality of bounds. The system can set the group of parameters to the new values and optimize the parameters by iteratively performing the bounding, determining and setting. The system can stop optimizing when a termination condition is reached.

25 Claims, 8 Drawing Sheets

(56) References Cited

OTHER PUBLICATIONS

J. Lafferty, A. McCallum, and F. Pereira. Conditional random fields: Probabilistic models for segmenting and labeling sequence data. In ICML, 2001, all pages.

A. Globerson, T. Koo, X. Carreras, and M. Coiiins. Exponentiated gradient algorithms for log-linear structured prediction. In ICML, 2007, all pages.

J. Darroch and D. Ratliff. Generalized iterative scaling for log-linear models, Annals of Math. Stat., 43:1470-1480, 1972.

D. Bohning and B. Lindsay. Monotonicity of quadratic approximation algorithms. Ann. Inst. Statist. Math., 40:641-663, 1988.

A. Berger. The improved iterative scaling algorithm: A gentle introduction. Technical report, 1997, all pages.

S. Della Pietra, V. Della Pietra, and J. Lafferty. Inducing features of random fieids. IEEE PAMI, 19(4), all pages.

R. Malouf. A comparison of algorithms for maximum entropy parameter estimation. In CoNLL, 2002, all pages.

H. Wallach. Efficient training of conditional random fields. Master's thesis, University of Edinburgh, 2002, all pages.

F. Sha and F. Pereira. Shallow parsing with conditional random fields. In NAACL, 2003 all pages.

C. Zhu, R. Byrd, p. Lu, and J. Nocedal. Algorithm 778: L-BFGS-B: Fortran subroutines for large-scale bound-constrained optimization. TOMS, 23(4), 1997. all pages.

S. Benson and J. More. A limited memory variable metric method for bound constrained optimization, Technical report, Argonne National Laboratory, 2001, all pages.

G. Andrew and J. Gao. Scalable training of $\ell$ 1-regularized log-linear models, In ICML, 2007, all pages.

D. Roth. Integer linear programming inference for conditional random fields. In ICML, 2005. all pages.

Y. Mao and G. Lebanon. Genenalized isotonic conditional random fields. Machine Learning, 77:225-248, 2009.

C. Sutton and A. McCallum. Piecewise training for structured prediction. Machine Learning, 77:165-194, 2009.

J. De Leeuw, "Convergence of the Majorization Method for Multi-dimensional Scaling," Journal of Classification (1988). all pages.

A. Dempster, N, Laird, and D. Rubin, Maximum likelihood from incomplete data via the EM algorithm. J. of the Royal Stat. Soc., B-39, 1977. all pages.

M. Wainwright and M Jordan. Graphical models, exponential families and variational inference. Foundations and Trends in Machine Learning, 1(1-2)1-305.2008.

T. Jebara and A. Pentland. On reversing Jensen's inequality. In NIPS, 2000. all pages.

J. Salojarvi, K Puolamaki, and S. Kaski. Expectation maximization algorithms for conditional likelihoods. In ICML, 2005. all pages.

A. Quattoni, S.Wang, L.P. Morency, M. Collins, and T. Darrell. Hidden conditional random fields. IEEE PAMI, 29(10):1848-1852, Oct. 2007.

T. Jaakkola and M. Jordan. Bayesian parameter estimation via variational methods. Statistics and Computing, 10:25-37, 2000.

G. Bouchard. Efficient bounds for the softmax and applications to approximate inference in hybrid models. In NIPS AIHM Workshop, 2007.

B. Taska, C Guestn, and D. Koler Max margin Makov netwoks. In NIPS, 2004. all pages.

Y. Qi, M. Szummer, and T. P. Minka. Bayesian conditional random fields. In A1STATS, 2005. all pages.

Paul Loya, Real Analysis 1, Chapter 5, "Infinite Series, Infinite Products, and Infinite Fractions," http://www.math.bingharnton.edu/dikran/478/Ch5.pdf (last visited Nov. 18, 2013). all pages.

S. B.Wang, a. Quattoni, L.-P. Morency, and D. Demirdjian. Hidden conditional random fields for gesture recognition. In CVPR, 2006. all pages.

Y. Wang and G, Mori. Max-margin hidden conditional random fields for human action recognition, In CVPR, pp. 872-879. IEEE, 2009.

F. Bach, R. Jenatton, J. Mairal, and G. Obozinski. Optimization for Machine Learning, chapter Convex optimization with sparsity-inducina norms. MIT Press, 2011. all pages.

Y. Altun, I. Tsochantaridis, and T. Hofmanft Hidden Markov support vector machines. In ICML, 2003. all pages.

Svn. Vishwanathan, N. Schraudolph, fsk Schmidt, and K. Murphy. Accelerated training of conditional random fields with stochastic gradient methods. In ICML, 2006. all pp. L.

T. Jebara. Multitask sparsity via maximum entropy discrimination. JMLR, 12:75-110, 2011.

Edwards, D., & Lauritzen, S. (2001). The TM algorithm for maximising a conditional likelihood function. Biometrika, 88, 961-972.

Bartlett, P., Collins, M., Taskar, B., & McAllester, D. (2005). Exponentiated gradient algorithms for largemargin structured classification. NIPS. all pages.

El Ghaoui, L. (2007). A convex upper bound on the log-partition function for binary graphical models (Technical Report UCB/EECS-2007-146). EECS Department, University of California, Berkeley. all pages.

T. Jebara and A. Chorornanska. "Majorization or CRFs and Latent Likelihoods" . Neural Information Processing Systems (NIPS), Dec. 2012. all pages.

T. Jebara and V. Shchogolev. "B-Matching for Spectral Clustering" European Conference on Machine Learning (ECML), Sep. 2006. all pages.

LeCun, Y., Bottou, L., Bengio, Y., & Haffner, P. (1998). Gradient-based learning applied to document recognition. Proceedings of the IEEE, 86. all pages.

Leisink, M., & Kappen, H. (2001). Means, correlations and bounds, Neural Information Processing Systems, Malouf, R. (2002). A comparison of algorithms for maximum entropy parameter estimation. Proceedings of the Sixth Conference on Natural Language Learning. all pages.

Saad, Y. (2000). Iterative methods for sparse linear systems. all pages.

Salakhutdinov, R., & Roweis, S. (2003). Adaptive overrelaxed bound optimization methods. ICML. all pages.

Taskar, B., Klein, D., Coffins, M., Koller, D., & Manning, C. (2004b). Max-margin parsing. EVINLP, all pages.

Tsochantaridis, I., Hofmann, T., Joachims, T., & Altun, Y. (2004). Support vector machine learning for interdependent and structured output spaces. ICML. all pages.

Wainwright, M., & Jordan, M. (2006). Log-determinant relaxation for approximate inference in discrete Markov random fields. IEEE Transactions on Signal Processing, all pages.

\* cited by examiner

SYSTEMS, DEVICE, AND METHODS FOR PARAMETER OPTIMIZATION

CROSS REFERENCE TO RELATED APPLICATIONS

This application claims the benefit of U.S. Provisional Application No. 61/494,281, entitled "Data Learning Using Probability Models and Conditional Random Fields" filed on 7 Jun. 2011, which is hereby incorporated herein by reference in its entirety.

FIELD

Embodiments relate generally to parameter optimization, and, more particularly, to computer systems, devices, methods and computer readable media for optimizing model parameters using partition function bounding.

BACKGROUND

Estimating probability density functions over sets of random variables can be a central problem in machine learning. For some problems, such as conditional random fields (CRFs) and log-linear models, estimation often requires minimizing a partition function.

Conventional bound-majorization methods were once used to optimize parameters and train models, but were overtaken by faster first-order and then second order methods.

SUMMARY

An embodiment optimizes partition functions by computing a quadratic variational upper bound. Embodiments include methods for computing a bound of the partition function for structured prediction (e.g., conditional random fields), conditional likelihood problems, graphical models and latent likelihood problems. Structured prediction applications can include, but are not limited to, pattern recognition, shallow parsing, named entity recognition, gene finding, object recognition and image segmentation systems.

Embodiments can include methods for tuning parameters for deep belief networks, automated labeling of data, web page parsing, named entity recognition, logistic regression, machine translation and web page annotation.

DETAILED DESCRIPTION

The partition function can play a key role in probabilistic modeling including conditional random fields (CRFs), maximum entropy methods, graphical models and maximum likelihood estimation. An embodiment can include upper bounding a partition function using a quadratic function and optimizing parameters using the bounding.

Figure 1:
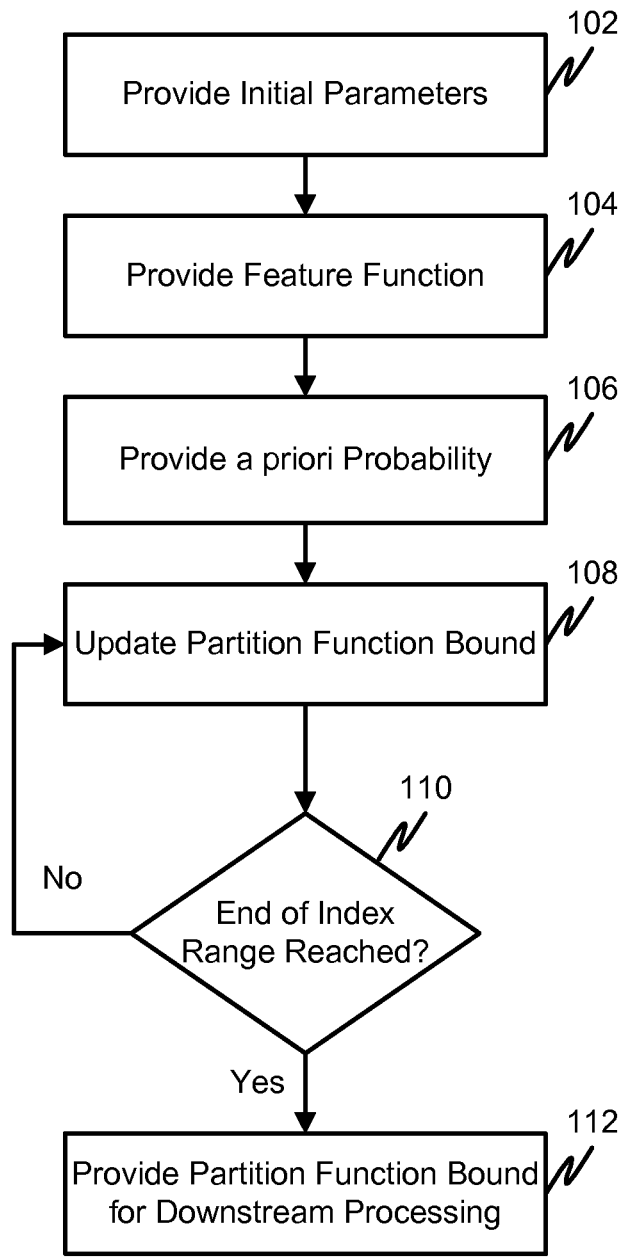
FIG. 1 is a flow chart of an example method for parameter optimization using a partition function bound in accordance with at least one embodiment.

FIG. 1 is a flow chart of an example method for parameter optimization using a partition function bound in accordance with at least one embodiment. In particular, at 102, initial parameters are provided to a system. At 104, a feature function (e.g., $f(y)$) is provided to the system and, at 106, an a priori probability function (e.g., $h(y)$) is provided to the system.

At 108, the system computes a quadratic upper bound on a partition function as described below.

At 110, the system tests a loop index. If the end of the index has been reached, processing continues to 112, otherwise processing continues to 108.

At 112, the quadratic parameters of the partition function bound are provided for downstream processing.

The mathematical basis for partition function bounding (e.g., as shown in FIG. 1) is set forth below:

Consider a log-linear density model over discrete $y \in \Omega$ $$p(y|\theta) = \frac{1}{Z(\theta)} h(y) \exp(\theta^T f(y))$$

which is parameterized by a vector $\theta \in \mathbb{R}^d$ of dimensionality $d \in \mathbb{Z}$. Here, $f:\Omega \mapsto \mathbb{R}^d$ is any vector-valued function mapping an input y to some arbitrary vector. The prior $h:\Omega \mapsto \mathbb{R}^+$ is a fixed non-negative measure. The partition function $Z(\theta)$ is a scalar that ensures that $p(y|\theta)$ normalizes, i.e. $Z(\theta) = \Sigma_y h(y) \exp(\theta^T f(y))$. Assume that the number of configurations of y is $|\Omega| = n$ and is finite. The partition function is clearly log-convex in $\theta$ and a linear lower-bound is given via Jensen's inequality. As mentioned above, an embodiment can include computing a quadratic upper-bound on the partition function. Algorithm 1, below, provides a mathematical computation for the bound's parameters. Theorem 1, below, shows the precise guarantee it provides.

---

Algorithm 1

Input $\tilde{\theta}$, f(y), h(y) $\forall y \in \Omega$
Init $z \to 0^+$, $\mu = 0$, $\Sigma = zI$
For each $y \in \Omega$ {

$\alpha = h(y)\exp(\tilde{\theta}^T f(y))$
$l = f(y) - \mu$ $\Sigma \mathrel{+}= \dfrac{\tanh\left(\frac{1}{2}\ln(\alpha/z)\right)}{2\ln(\alpha/z)} ll^T$ $\mu \mathrel{+}= \dfrac{\alpha}{z+\alpha} l$ $z \mathrel{+}= \alpha$ }

Output $z, \mu, \Sigma$

---

Theorem 1

Algorithm 1 finds $z, \mu, \Sigma$ such that $z \exp(\frac{1}{2}(\theta-\tilde{\theta})^T\Sigma(\theta-\tilde{\theta})+(\theta-\tilde{\theta})^T\mu)$ upper-bounds $Z(\theta)=\Sigma_y h(y)\exp(\theta^T f(y))$ for any $\theta, \tilde{\theta}$, $f(y) \in \mathbb{R}^d$ and $h(y) \in \mathbb{R}^+$ for all $y \in \Omega$.

The bound can improve previous inequalities and its proof is in the Appendix. For example, the bound can be computed using Algorithm 1 by iterating over the y variables ("for each $y \in \Omega$") according to an arbitrary ordering via the bijective function $\pi: \Omega \mapsto \{1, \ldots, n\}$ which defines $i=\pi(y)$. The order in which we enumerate over $\Omega$ slightly varies the $\Sigma$ in the bound (but not the $\mu$ and $z$) when $|\Omega|>2$. Recall that choosing $\Sigma=\Sigma_y h(y)\exp(\tilde{\theta}^T f(y))(f(y)-\mu)(f(y)-\mu)^T$ with $\mu$ and $z$ as in Algorithm 1 yields the second-order Taylor approximation (the Hessian) of the log-partition function. Algorithm 1 replaces a sum of log-linear models with a single log-quadratic model which makes monotonic majorization straightforward.

Figure 2:
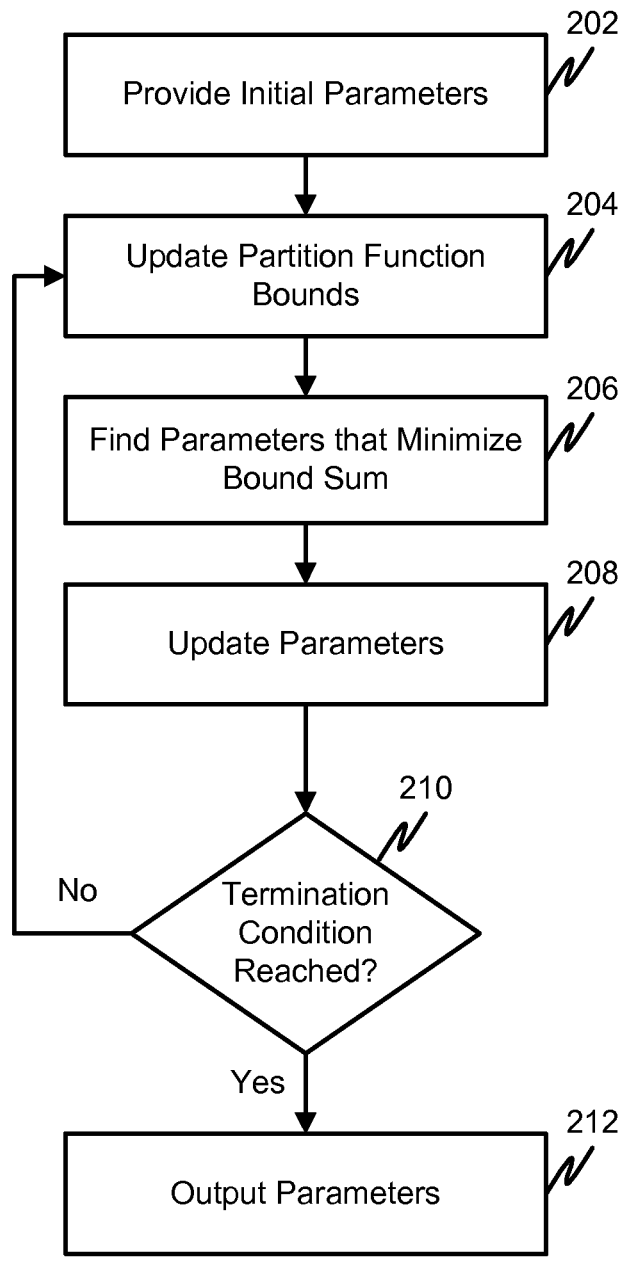
FIG. 2 is a flow chart of an example method for parameter optimization for a model conditioned on observed input in accordance with at least one embodiment.

FIG. 2 is a flow chart of an example method for parameter optimization for a model conditioned on observed input in accordance with at least one embodiment.

At 202, initial parameters are provided to a system.

At 204, the system computes or updates partition functions bounds. For example, the partition function bounds can be computed according to Algorithm 1 discussed above.

At 206, parameters are selected that minimize the sum of the bounds.

At 208, the current parameters are updated based on the selected parameters.

At 210, the system determines if a termination condition has been reached. The termination condition can include one or more of a predetermined number of iterations, a predetermined amount of elapsed time, and a difference between current parameters and subsequent parameters of less than a predetermined threshold. If the termination condition has been reached, the parameters can be provided for use in a downstream process. Otherwise, if the termination condition has not been reached, processing can continue back to 204, where the bounding and minimizing can be performed again. In general, the bounding and minimizing can be repeated until the parameters converge.

Partition functions arise naturally in maximum entropy estimation or minimum relative entropy $$RE(p \| h) = \sum_y p(y) \ln \frac{p(y)}{h(y)}$$

estimation as follows $$\min_p RE(p \| h) \text{ s.t. } \sum_y p(y) f(y) = 0, \sum_y p(y) g(y) \geq 0.$$

Therein, $y \in \Omega$, $f: \Omega \mapsto \mathbb{R}^d$ and $g: \Omega \mapsto \mathbb{R}$ are arbitrary (non-constant) vector-valued functions over the sample space. The solution distribution $p(y) = h(y)\exp(\theta^T f(y) + \vartheta^T g(y))/Z(\theta, \vartheta)$ is recovered by the dual optimization $$\theta, \vartheta = \underset{\vartheta \geq 0, \theta}{\arg\max} -\ln \sum_y h(y)\exp(\theta^T f(y) + \vartheta^T g(y))$$

where $\theta \in \mathbb{R}^d$ and $\vartheta \in \mathbb{R}^{d_t}$. These are obtained by minimizing $Z(\theta, \vartheta)$ or equivalently by maximizing its negative logarithm. Algorithm 1 permits variational maximization of the dual via the quadratic program $$\min_{\vartheta \geq 0, \theta} \frac{1}{2}(\beta - \tilde{\beta})^T \Sigma (\beta - \tilde{\beta}) + \beta^T \mu$$

where $\beta^T = [\theta^T \vartheta^T]$. In fact, any general convex hull of constraints $\beta \in \Lambda \subseteq \mathbb{R}^{d+d_t}$ could be imposed without loss of generality. In the case where there are no inequality constraints in the maximum entropy problem, only $\theta \in \mathbb{R}^d$ is to be recovered and a simple closed-form iterative update rule emerges: $\tilde{\theta} \leftarrow \tilde{\theta} - \Sigma^{-1}\mu$. This rule is interleaved with the bound computation to solve the dual optimization and obtain $\theta$.

The partition function also arises in conditional extensions of the maximum entropy paradigm where the model is conditioned on an observed input. Such models are known as conditional random fields and have been useful for structured prediction problems. CRFs are given a data-set $\{(x_1, y_1), \ldots, (x_t, y_t)\}$ of independent identically-distributed (iid) input-output pairs where $y_j$ is the observed sample in a (discrete) space $\Omega_j$ conditioned on the observed input $x_j$. A CRF defines a distribution over all $y \in \Omega_j$ (of which $y_j$ is a single element) as the log-linear model $$p(y \mid x_j, \theta) = \frac{1}{Z_{x_j}(\theta)} h_{x_j}(y) \exp(\theta^T f_{x_j}(y))$$

where $Z_{x_j}(\theta) = \Sigma_{y \in \Omega_j} h_{x_j}(y) \exp(\theta^T f_{x_j}(y))$. For the j'th training pair, we are given a non-negative function $h_{x_j}(y) \in \mathbb{R}^+$ and a vector-valued function $f_{x_j}(y) \in \mathbb{R}^d$ defined over the domain $y \in \Omega_j$. In this section, for simplicity, assume $n = \max_{j=1}^t |\Omega_{y_j}|$. Each partition function $Z_{x_j}(\theta)$ is a function of $\theta$. The parameter $\theta$ for CRFs is estimated by maximizing the regularized conditional log-likelihood or log-posterior:

$$\sum_{j=1}^t \ln p(y_j \mid x_j, \theta) - \frac{t\lambda}{2}\|\theta\|^2$$

where $\lambda \in \mathbb{R}^+$ is a regularizer set using prior knowledge or cross-validation. Rewriting gives the objective of interest $$J(\theta) = \sum_{j=1}^t \ln \frac{h_{x_j}(y_j)}{z_{x_j}(\theta)} + \theta^T f_{x_j}(y_j) - \frac{t\lambda}{2}\|\theta\|^2. \quad (1)$$

If prior knowledge (or constraints) restrict the solution vector to a convex hull $\Lambda$, the maximization problem becomes $\operatorname{argmax}_{\theta \in \Lambda} J(\theta)$. The maximization of Equation 1 thus subsumes the minimum relative entropy problem.

Algorithm 3 proposes a method for maximizing the regularized conditional likelihood $J(\theta)$ or, equivalently minimizing the partition function $Z(\theta)$. It solves the problem in Equation 1 subject to convex constraints by interleaving the quadratic bound with a quadratic programming procedure. Theorem 2 establishes the convergence of the algorithm and the proof is in the Supplement.

| Algorithm 2 |
| --- |
| 0:    Input $x_j, y_j$ and functions $h_{x_j}, f_{x_j}$ for j = 1, ..., t<br>       Input regularizer $\lambda \in \mathbb{R}^+$ and convex hull $\Lambda \subset \mathbb{R}^d$ |

-continued

Algorithm 2

1: Initialize $\theta_0$ anywhere inside $\Lambda$ and set $\tilde{\theta} = \theta_0$
   While not converged
2: For j = 1, ..., t
   Get $\mu_j, \Sigma_j$ from $h_{xj}, f_{xj}, \tilde{\theta}$ via Algorithm 1
3: Set $\tilde{\theta} = \arg\min_{\theta \in \Lambda} \Sigma_j \frac{1}{2}(\theta - \tilde{\theta})^T (\Sigma_j + \lambda I)(\theta - \tilde{\theta})$
   $+ \Sigma_j \theta^T (\mu_j - f_{xj}(y_j) + \lambda\tilde{\theta})$
4: Output $\hat{\theta} = \tilde{\theta}$ Theorem 2

For any $\theta_0 \in \Lambda$, all $\|f_{x_j}(y)\|^2 \le r$ and all $|\Omega_j| \le n$, Algorithm 2 outputs a $\hat{\theta}$ such that $$J(\hat{\theta}) = J(\theta_0) \ge (1-\varepsilon)\max_{\theta \in \Lambda}(J(\theta) - J(\theta_0)) \text{ within}$$

$$\left\lceil \ln\left(\frac{1}{\varepsilon}\right) \bigg/ \ln\left(1 + \frac{\lambda}{2r}\left(\sum_{i=1}^{n-1} \frac{\tanh(\ln(i)/2)}{\ln(i)}\right)^{-1}\right) \right\rceil \text{ steps.}$$

The series $$\sum_{i=1}^{n-1} \frac{\tanh(\ln(i)/2)}{\ln(i)} = \sum_{i=1}^{n-1} \frac{i-1}{(i+1)\ln(i)}$$

is the logarithmic integral which is $$O\left(\frac{n}{\ln n}\right)$$

asymptotically.

Maximum conditional likelihood is extended to the setting where some variables are latent. We are given t iid samples $x_1, \ldots, x_t$ from some unknown distribution $\bar{p}(x)$ and t corresponding samples $y_1, \ldots, y_t$ drawn from identical conditional distributions $\bar{p}(y|x_1), \ldots, \bar{p}(y|x_t)$ respectively. Assume that the true generating distributions $\bar{p}(x)$ and $\bar{p}(y|x)$ are unknown. Therefore, we aim to estimate a conditional distribution $p(y|x)$ from some set of hypotheses that achieves high conditional likelihood given the data-set $D=\{(x_1, y_1), \ldots, (x_t, y_t)\}$. We will select this conditional distribution by assuming it emerges from a conditioned joint distribution over x and y as well as a hidden variable m which is being marginalized as $$p(y|x, \Theta) = \frac{\sum_m p(x, y, m | \Theta)}{\sum_{y,m} p(x, y, m | \Theta)}.$$

Here $m \in \Omega_m$ represents a discrete hidden variable, $x \in \Omega_x$ is an input and $y \in \Omega_y$ is a discrete output variable. The parameter $\Theta$ contains all parameters that explore the function class of such conditional distributions. The latent likelihood of the data $L(\Theta) = p(D|\Theta)$ subsumes Equation 1 and is the new objective of interest $$L(\Theta) = \prod_{j=1}^{t} p(y_j | x_j, \Theta) = \prod_{j=1}^{t} \frac{\sum_m p(x_j, y_j, m | \Theta)}{\sum_{y,m} p(x_j, y, m | \Theta)}. \quad (2)$$

A good choice of the parameters is one that achieves a large conditional likelihood value (or posterior) on the data set D. Next, assume that each $p(x|y, m, \Theta)$ is an exponential family distribution $$p(x|y,m,\Theta) = h_{y,m}(x)\exp(\theta_{y,m}^T \phi_{y,m}(x) - a_{y,m}(\theta_{y,m}))$$

where each conditional is specified by a function $h_{y,m}:\Omega_x \mapsto \mathbb{R}^+$ and a feature mapping $\phi_{y,m}:\Omega_x \mapsto \mathbb{R}^{d_{y,m}}$ which are then used to derive the normalizer $a_{y,m}:\mathbb{R}^{d_{y,m}} \mapsto \mathbb{R}^+$. A parameter $\theta_{y,m} \in \mathbb{R}^{d_{y,m}}$ selects a specific distribution. Multiply each exponential family term by an unknown marginal distribution called the mixing proportions $$p(y, m | \pi) = \frac{\pi_{y,m}}{\sum_{y,m} \pi_{y,m}}.$$

This is parametrized by an unknown parameter $\pi = \{\pi_{y,m}\} \forall y,m$ where $\pi_{y,m} \in [0, \infty)$. Finally, the collection of all parameters is $\Theta = \{\theta_{y,m}, \pi_{y,m}\} \forall y,m$. Thus, we have the complete likelihood $$p(x, y, m | \Theta) = \frac{\pi_{y,m} h(x)}{\sum_{y,m} \pi_{y,m}} \exp(\theta_{y,m}^T \phi(x) - a(\theta_{y,m}))$$

where, without loss of generality, we dropped the index y, m indexing $h(x)$, $\phi(x)$, and $a(\theta)$, making each conditional belong to the same exponential family form. Insert this expression into Equation 2 and remove constant factors that appear in both denominator and numerator. Apply the change of variables $\exp(v_{y,m}) = \pi_{y,m}\exp(-a(\theta_{y,m}))$ and rewrite as $$L(\Theta) = \prod_{j=1}^{t} \frac{\sum_m \exp(\theta_{y_j,m}^T \phi(x_j) + v_{y_j,m})}{\sum_{y,m} \exp(\theta_{y,m}^T \phi(x_j) + v_{y,m})}.$$

The objective as a function (it is now easy to regularize $L(\theta)$ by adding $$-\frac{t\lambda}{2}\|\theta\|^2)$$

of a vector $\theta$ is simply $$L(\theta) = \prod_{j=1}^{t} \frac{\sum_m \exp(\theta^T f_{j,y_j,m})}{\sum_{y,m} \exp(\theta^T f_{j,y,m})}$$

after arranging parameters $\Theta$ in $\theta \in \mathbb{R}^{|\Omega_y||\Omega_m|(d+1)}$ as $$[\theta_{1,1}^T v_{1,1} \theta_{1,2}^T v_{1,2} \ldots \theta_{|\Omega_y|,|\Omega_m|}^T v_{|\Omega_y|,|\Omega_m|}]^T.$$

Similarly, introduce vectors $f_{j,\hat{y},\hat{m}} \in \mathbb{R}^{|\Omega_y||\Omega_m|(d+1)}$ defined as $$[[\phi(x_j)^T 1]\delta[(\hat{y},\hat{m})=(1,1)] \ldots [\phi(x_j)^T 1]\delta[(\hat{y},\hat{m})=(|\Omega_y|, |\Omega_m|)]]^T.$$

In other words, the feature vector $[\phi(x_j)^T 1]^T$ is positioned appropriately in the longer $f_{j,\tilde{y},\tilde{m}}$ vector which is otherwise equal to zero. Consider finding a variational lower bound on $L(\theta) \geq Q(\theta, \tilde{\theta})$ which is tight when $\theta = \tilde{\theta}$ such that $L(\tilde{\theta}) = Q(\tilde{\theta}, \tilde{\theta})$. We proceed by bounding each numerator and each denominator in the product over $j=1, \ldots, t$ as follows. Apply Jensen's inequality to lower bound each numerator term as $$\sum_m \exp(\theta^T f_{j,y_j,m}) \geq e^{\theta^T \sum_m \eta_{j,m} f_{j,y_j,m} - \sum_m \eta_{j,m} \ln \eta_{j,m}}$$

where $$\eta_{j,m} = \left(e^{\tilde{\theta}^T f_{j,y_j,m}}\right) \bigg/ \left(\sum_{m'} e^{\tilde{\theta}^T f_{j,y_j,m'}}\right).$$

Algorithm 1 then bounds the denominator $$\sum_{y,m} \exp(\theta^T f_{j,y,m}) \leq z_j e^{\frac{1}{2}(\theta-\tilde{\theta})^T \Sigma_j (\theta-\tilde{\theta}) + (\theta-\tilde{\theta})^T \mu_j}.$$

The overall lower bound on the likelihood is then $$Q(\theta, \tilde{\theta}) = L(\tilde{\theta}) e^{-\frac{1}{2}(\theta-\tilde{\theta})^T \tilde{\Sigma}(\theta-\tilde{\theta}) - (\theta-\tilde{\theta})^T \tilde{\mu}}$$

where $\tilde{\Sigma} = \sum_{j=1}^t \Sigma_j$ and $\tilde{\mu} = \sum_{j=1}^t \mu_j - \sum_m \eta_{j,m} f_{j,y_j,m}$. The right hand side is simply an exponentiated quadratic function in $\theta$ which is easy to maximize. In the unconstrained case, this yields the update rule $\theta = \tilde{\theta} - \tilde{\Sigma}^{-1} \tilde{\mu}$. Alternatively, if $\theta$ must satisfy linear (convex) constraints it is straightforward to compute an update by solving a quadratic (convex) program. This yields an iterative scheme similar to Algorithm 2 for monotonically maximizing latent conditional likelihood.

Figure 3:
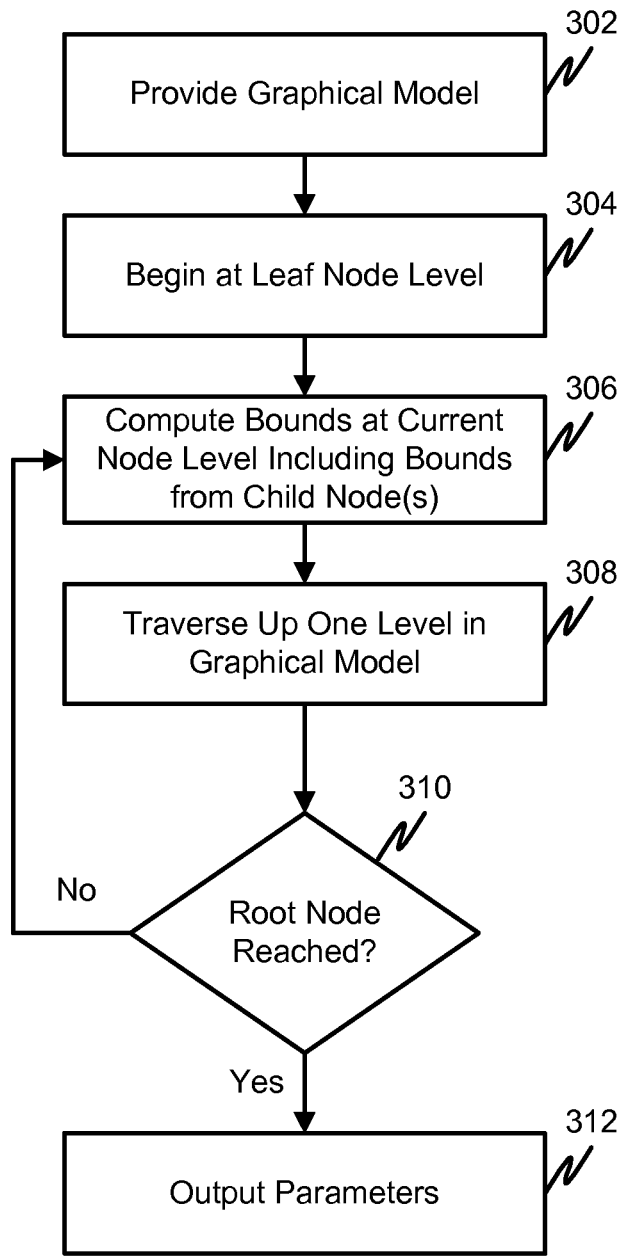
FIG. 3 is a flow chart of an example method for parameter optimization for a graphical model in accordance with at least one embodiment.

FIG. 3 is a flow chart of an example method for parameter optimization for a graphical model in accordance with at least one embodiment.

At 302, a graphical model is provided to a system. The graphical model can be in the form of a junction tree, for example, or converted from a first form into a junction tree.

At 304, the system can set indexes to begin at a leaf node level of the graphical model.

At 306, bounds at the current node level can be computed and/or updated. The bound computation includes collecting pre-computed bounds from child nodes, as described below with respect to Algorithm 3.

At 308, the system traverses up one level in the graphical model.

At 310, the system determines if it has reached a root node level (e.g., reached the node level associated with index m as discussed below). If the system has not reached the root node level, then processing continues to 306. If the system has reached the root node level, then processing continues to 312 where parameters of a quadratic partition function bound are provided as output.

The bounds discussed above (e.g., Algorithms 1 and 2) are straightforward to compute when $\Omega$ is small. However, for graphical models, enumerating over $\Omega$ can be daunting. The method described in FIG. 3 above and in Algorithm 3 below provides faster algorithms that recover the bound efficiently for graphical models of bounded tree-width. A graphical model represents the factorization of a probability density function. This example uses a factor graph notation of a graphical model. A factor graph is a bipartite graph $G=(V, W, E)$ with variable vertices $V=\{1, \ldots, k\}$, factor vertices $W=\{1, \ldots, m\}$ and a set of edges E between V and W. In addition, define a set of random variables $Y=\{y_1, \ldots, y_k\}$ each associated with the elements of V and a set of non-negative scalar functions $\Psi = \{\psi_1, \ldots, \psi_m\}$ each associated with the elements of W. The factor graph implies that p(Y) factorizes as $$p(y_1, \ldots, y_k) = \frac{1}{Z} \prod_{c \in W} \psi_c(Y_c)$$

where Z is a normalizing partition function (the dependence on parameters is suppressed here) and $Y_c$ is a subset of the random variables that are associated with the neighbors of node c. In other words, $Y_c = \{y_i | i \in Ne(c)\}$ where Ne(c) is the set of vertices that are neighbors of c.

Inference in graphical models requires the evaluation and the optimization of Z. These computations can be NP-hard in general yet are efficient when G satisfies certain properties. Consider the function class $p(Y|\theta)$ indexed by a parameter $\theta \in \Lambda$ where $\Lambda \subseteq \mathbb{R}^d$ is a convex hull. More specifically, consider the log-linear model $$p(Y|\theta) = \frac{1}{Z(\theta)} \prod_{c \in W} h_c(Y_c) \exp(\theta^T f_c(Y_c))$$

where $Z(\theta) = \sum_Y \prod_{c \in W} h_c(Y_c) \exp(\theta^T f_c(Y_c))$. The model is defined by a set of vector-valued functions $f_c(Y_c) \in \mathbb{R}^d$ and scalar-valued functions $h_c(Y_c) \in \mathbb{R}^+$. Choosing a function from the function class hinges on estimating $\theta$ by optimizing $Z(\theta)$. However, Algorithm 1 may be inapplicable due to the large number of configurations in Y. Instead, consider a more efficient surrogate algorithm which computes the same bound parameters by efficiently exploiting the factorization of the graphical model. This is possible since exponentiated quadratics are closed under multiplication and the required bound computations distribute nicely across decomposable graphical models.

Begin by assuming that the graphical model in question is a junction tree and satisfies the running intersection property. It is known that any graphical model can be converted into such a form at the expense of growing the cardinality of the factors $c \in W$. Starting with a general graph G, convert it into a junction tree T as follows. First, triangulate it by adding as few edges as possible (this does not change $p(Y|\theta)$). Once triangulated, form a junction tree T by connecting overlapping cliques to maximize the sum of the cardinalities of clique intersections. Then, using the junction tree T, compute the bound parameters via Algorithm 3. This algorithm only requires enumerating over each configuration of pairs of adjacent cliques which is clearly more efficient than enumerating over all configurations of Y. Algorithm 3 can be used interchangeably with Algorithm 1 when the partition function involves a graphical model.

In Algorithm 3, take ch(c) to be the set of children-cliques of clique c and pa(c) to be the parent of c. Note that the algorithm enumerates over $u \in Y_{pa(c)} \cap Y_c$ and $v \in Y_c \setminus Y_{pa(c)}$. The algorithm stores a quadratic bound for each configuration of u (where u is the set of variables in common across both clique c and its parent). It then forms the bound by summing over $v \in Y_c \setminus Y_{pa(c)}$, each configuration of each variable a clique c has that is not shared with its parent clique. The algorithm also collects precomputed bounds from children of c. Also define $w = u \otimes v \in Y_c$ as the conjunction of both indexing variables u and v. Thus, the two inner for loops enumerate over all configurations $w \in Y_c$ of each clique. Note that w is used to query the children $b \in ch(c)$ of a clique c to report their bound parameters $z_{b|w}, \mu_{b|w}, \Sigma_{b|w}$. This is done for each configuration w of the clique c. Note, however, that not every variable in clique c is present in each child b so only the variables in w that intersect $Y_b$ are relevant in indexing the parameters $z_{b|w}, \mu_{b|w}, \Sigma_{b|w}$, and the remaining variables do not change the values of $z_{b|w}, \mu_{b|w}, \Sigma_{b|w}$.

---

Algorithm 3

---

Input $\tilde{\theta} \in \mathbb{R}^d$ and reverse-topological tree T with
  $c=1, \ldots, m$ factors $h_c(Y_c)\exp(\theta^T f_c(Y_c))$
for $c=1, \ldots, m$
  if ($c<m$) $\{Y_{both} = Y_c \cap Y_{pa(c)}, Y_{solo} = Y_c \backslash Y_{pa(c)}\}$
  else $\{Y_{both} = \{\}, Y_{solo} = Y_c\}$
  for each $u \in Y_{both}$
  initialize $z_{c|x} \leftarrow 0^+, \mu_{c|x} = 0, \Sigma_{c|x} = z_{c|x} I$
  for each $v \in Y_{solo}$
  { $w = u \otimes v$ $\alpha_w = h_c(w) e^{\tilde{\theta}^T f_c(w)} \prod_{b \in ch(c)} z_{b|w}$
  $l_w = f_c(w) - \mu_{c|u} + \Sigma_{b \in ch(c)} \mu_{b|w}$ $$\sum_{c|u} += \sum_{b \in ch(c)} \sum_{b|w} + \frac{\tanh\left(\frac{1}{2}\ln\left(\frac{\alpha_w}{z_{c|u}}\right)\right)}{2\ln\left(\frac{\alpha_w}{z_{c|u}}\right)} l_w l_w^T$$

$\mu_{c|u} += \frac{\alpha_w}{z_{c|u} + \alpha_w} l_w$ $z_{c|u} += \alpha_w$ }
Output   Bound as $z = z_m, \mu = \mu_m, \Sigma = \Sigma_m$

---

Algorithm 3 is efficient in the sense that computations involve enumerating over all configurations of each clique in the junction tree rather than over all configurations of Y. This shows that the computation involved is $O(\Sigma_c|Y_c|)$ rather than $O(|\Omega|)$ as in Algorithm 1. Thus, for estimating the computational efficiency of various algorithms in this article, take $n = \Sigma_c |Y_c|$ for the graphical model case rather than $n = |\Omega|$. Algorithm 3 is a simple extension of the known recursions that are used to compute the partition function and its gradient vector. Thus, in addition to the $\Sigma$ matrix which represents the curvature of the bound, Algorithm 3 is recovering the partition function value z and the gradient since $$\mu = \left.\frac{\partial \ln Z(\theta)}{\partial \theta}\right|_{\theta=\tilde{\theta}}.$$

Figure 4:
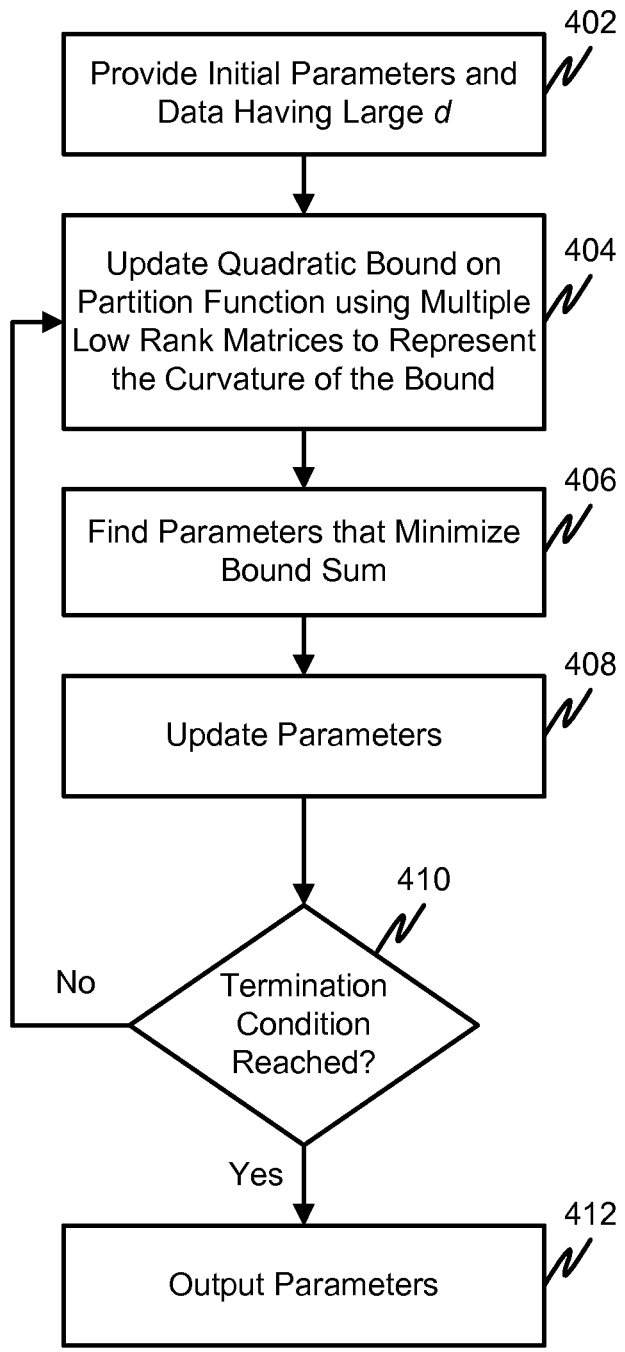
FIG. 4 is a flow chart of an example method for parameter optimization for high dimensional models in accordance with at least one embodiment.

FIG. 4 is a flow chart of an example method for parameter optimization for high dimensional models in accordance with at least one embodiment.

At 402 a system is provided with initial parameters and/or data having one or more large dimensions.

At 404, the quadratic bound of the partition function is updated by representing the curvature of the quadratic with a group of matrices of relatively low rank compared to a dimension of one or more of the inputs.

At 406, the system finds parameters that minimize a sum of the bounds.

At 408, the system updates stored parameters.

At 410, the system test for a termination condition. The termination condition can include one or more of the conditions described above with respect to 210 of FIG. 2.

At 412, the system provides parameters as output.

Consider the situation where d is large and Algorithm 2 cannot store and invert the matrix $\Sigma = t\lambda I + \Sigma_{j=1}^t \Sigma_j'$. Each loop of the algorithm requires $O(tnd^2 + d^3)$ time since step 2 requires computes each $\Sigma_j' \in \mathbb{R}^{d \times d}$ and step 3 performs inversion. Algorithm 4 provides a low-rank version of the bound which majorizes the log-partition function but requires only $O\tilde{}(tnd)$ complexity (on par with LBFGS). Below is a description of the mathematical algorithm changes to Algorithm 3 in order to efficiently handle high dimension inputs.

We first replace step 3 in Algorithm 2 with $\tilde{\theta} = \tilde{\theta} - Mu$ with $M = \Sigma^{-1}$ and $u = t\lambda\tilde{\theta} + \Sigma_{j=1}^t \mu_j - f_{x_j}(y_j)$. Clearly, we can recover u by only computing $\mu_{-j}$ for $j=1, \ldots, t$ and skipping all steps involving matrices. This merely requires $O(tnd)$ work. Second, instead of $\Sigma$, we initialize $$M = \frac{1}{t\lambda} I$$

and use Sherman-Morrison to incrementally invert it via $$M_i = M_{i-1} - \frac{M_{i-1} q_i q_i^T M_{i-1}}{1 + q_i^T M_{i-1} q_i} \text{ where}$$

$$q_i = \sqrt{\frac{\tanh\left(\frac{1}{2}\ln(\alpha/z)\right)}{2\ln(\alpha/z)}} (f_i - \mu_i).$$

Here, the index i ranges over all rank 1 updates to the matrix $\Sigma$ for all elements of $\Omega$ as well as $j=1, \ldots, t$. Third, we store M using a low-rank representation $VSV^T + D$ where $V \in R^{(k \times d)}$ is orthonormal, $S \in R^{(k \times k)}$ is non-positive diagonal and $D \in R^{(n \times n)}$ is non-negative diagonal. To decrement the matrix by a rank one update of the form $M_i = M_{i-1} - r_i r_i^T$, simply project $r_i$ onto each eigenvector in V and update the appropriate singular value in S. After k such projections, the remaining residual from $r_i$ is a new candidate eigenvector $e_{(k+1)}$ and its magnitude is a candidate singular value. The resulting rank (k+1) system is orthonormal with (k+1) singular values. We discard the smallest singular value and its corresponding eigenvector to revert back to an order k eigensystem. However, instead of discarding it we absorb the smallest singular value and eigenvector into the D component by bounding the remaining outer-product with a diagonal term. This provides a guaranteed overall upper bound in $O\tilde{}(tnd)$ (k is set be logarithmic with dimension d).

---

Algorithm 4

---

Input $\tilde{\theta}, f_t(y) \in \mathbb{R}^d$ and $\lambda, h_t(y) \in \mathbb{R}^+$ with $k \in \mathbb{N}$ $S = \text{diag}(0), V = \text{orthonormal}, D = \frac{1}{|t|\lambda}\text{diag}(I)$ For each t {
  Set $z \to 0^+; \mu = 0$;
  For each y {

-continued

Algorithm 4

$$\alpha = h_t(y)e^{\tilde{\theta}^T f_t(y)}; \quad q = \frac{\sqrt{\tanh\left(\frac{1}{2}\ln\left(\frac{\alpha}{z}\right)\right)}}{\sqrt{2\ln\left(\frac{\alpha}{z}\right)}}(f_t(y) - \mu);$$

$$r = V(S(V^T q)) + Dq; \quad r = \frac{1}{\sqrt{1 + r^T q}}r; \quad r = r;$$

Figure 5:
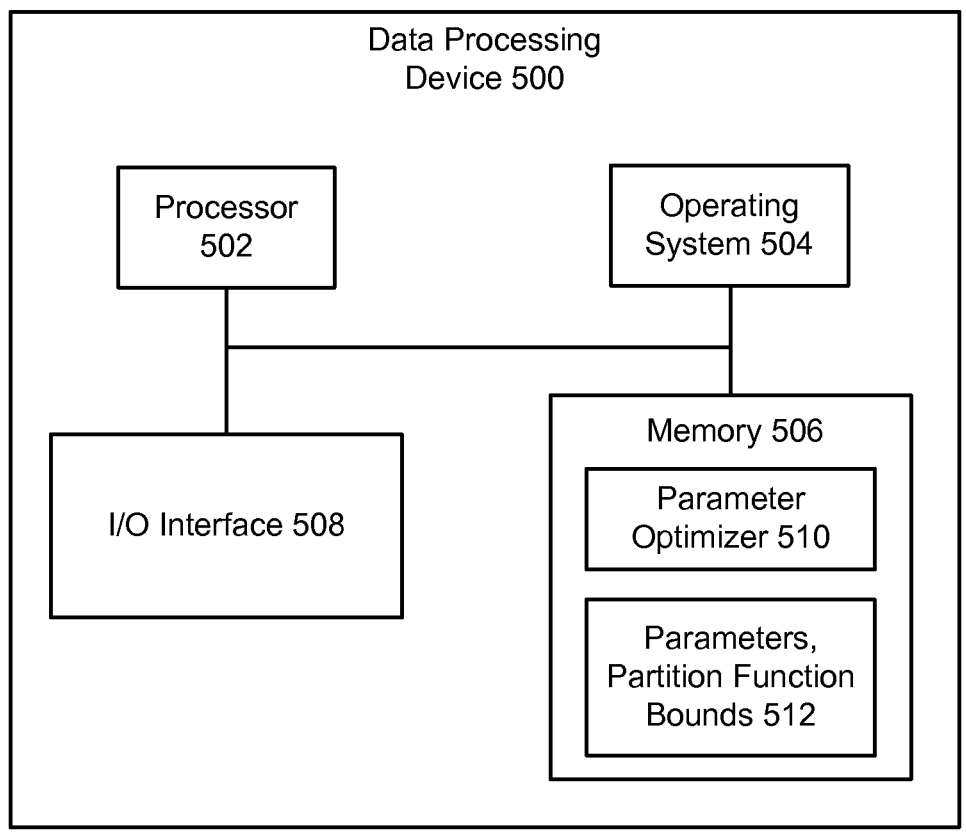
FIG. 5 is a diagram of an example parameter optimization system in accordance with at least one embodiment.

For j=1, . . . ,k
 $\rho = r^T V(j,\bullet); S(j, j) = S(j, j) - \rho^2;$
 $r = r - \rho V(j,\bullet); s = [S(1,1), \ldots, S(k,k), - \|r\|^2]^T$
  $\tilde{k} = \text{argmax}_{i=1,\ldots,k+1} s(i);$
  if ($\tilde{k} \le k$) { {
   $D = D + S(\tilde{k}, \tilde{k})|1^T V(j,\bullet)|\text{diag}(|V(k,\bullet)|);$
   $S(\tilde{k}, \tilde{k}) = -\|r\|^2; r = \|r\|(-1) r; V(k,\bullet) = r$ }
  else { $D = D - |1^T r|\text{diag}(|r|)$ } }
 $\mu += \frac{\alpha}{z + \alpha}(f_t(y) - \mu); z += \alpha;$ } }
Output $S \in \text{diag}(\mathbb{R}^{k \times k}), V \in \mathbb{R}^{d \times k}, D \in \text{diag}(\mathbb{R}^{d \times d})$ FIG. 5 is a diagram of an example parameter optimization system 500 that can be used to optimize parameters in accordance with at least one embodiment. The system 500 includes a processor 502, an operating system 504, memory 506 and an I/O interface 508. The memory 506 can include a parameter optimizer 510 and a section for parameter data 512 and data used to optimize parameters by computing a quadratic bound on a partition function.

In operation, the processor 502 may execute the parameter optimizer 510 stored in the memory 506. The parameter optimizer 510 can include software instructions that, when executed by the processor, cause the processor to perform operations for optimizing parameters in accordance with the present disclosure (e.g., performing one or more of steps 102-112, 202-212, steps 302-312 and/or steps 402-412 described above).

The parameter optimizer 510 can operate in conjunction with the operating system 504 and utilize the parameter data 512 as described above.

Figure 6:
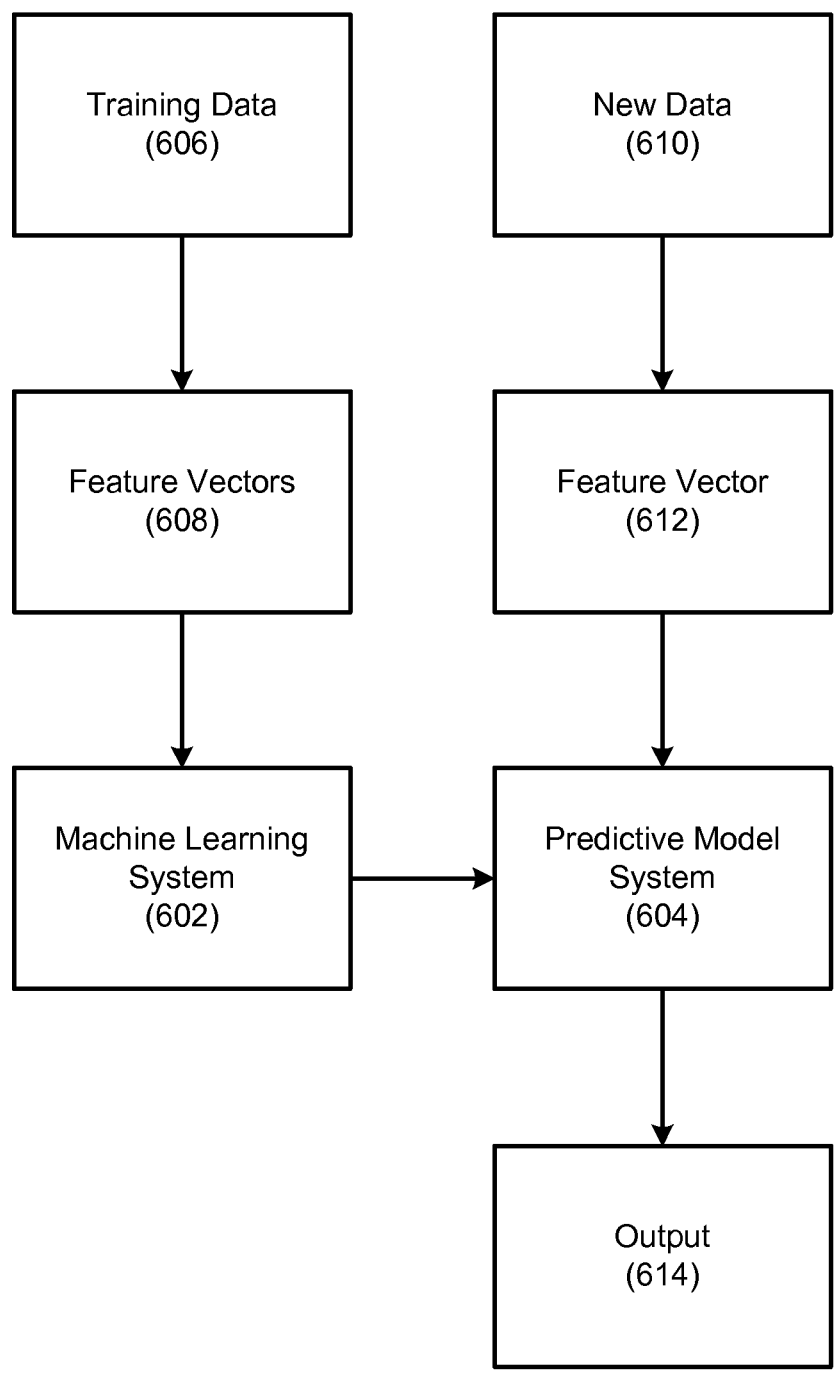
FIG. 6 is a diagram of an example unsupervised machine learning system in accordance with at least one embodiment.

FIG. 6 is a diagram of an example unsupervised machine learning environment 600. The environment 600 includes a machine learning system 602 and a prediction system 604.

In operation, the machine learning system 602 receives feature vectors 608 derived from input data (e.g., image data, audio data, text files, web pages or the like). The machine learning system can determine an optimized parameter set based on the input feature vectors. The parameters can be learned or tuned using one or more of the partition function bounding techniques described above.

The tuned or optimized parameters can be supplied by the machine learning system 602 to the prediction system 604. The prediction system 604 can receive a feature vector 612 derived from new input data 610. Using the parameters received from the machine learning system 602, the prediction system 604 can make a prediction about the feature vector 612 and produce an output 614. The output can include a likelihood, an expected label, a predicted result or the like.

Figure 7:
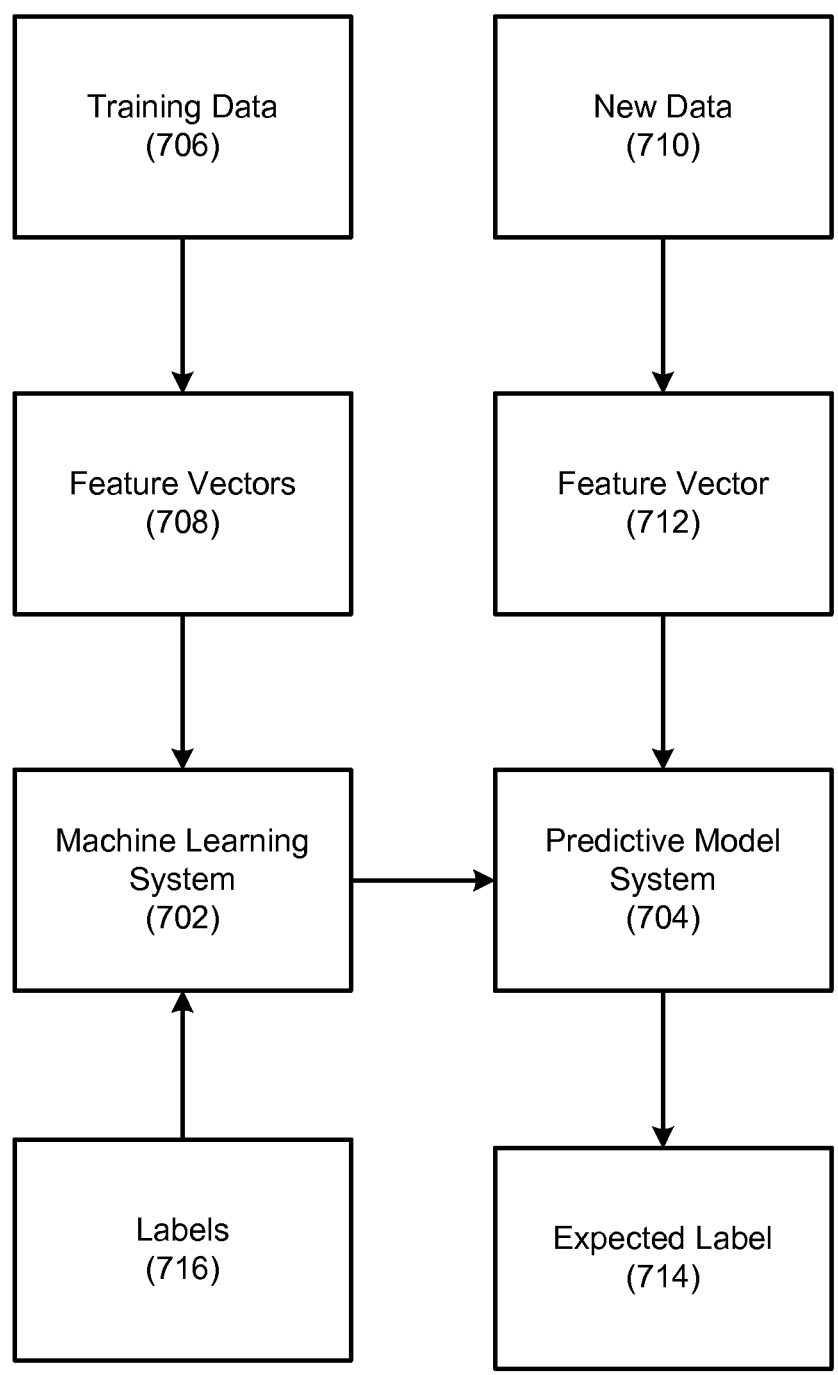
FIG. 7 is a diagram of an example supervised machine learning system in accordance with at least one embodiment.

FIG. 7 is a diagram of an example supervised machine learning environment 700. The environment 700 includes a machine learning system 702 and a prediction system 704.

In operation, the machine learning system 702 receives feature vectors 708 derived from input data (e.g., image data, audio data, text files, web pages or the like). As part of supervised learning, the machine learning system 702 can also receive information (e.g., labels 716) corresponding to the feature vectors 708. The machine learning system can determine an optimized parameter set based on the input feature vectors 708 and the labels 716. The parameters can be learned or tuned using one or more of the partition function bounding techniques described above.

The tuned or optimized parameters can be supplied by the machine learning system 702 to the prediction system 704. The prediction system 704 can receive a feature vector 712 derived from new input data 710. Using the parameters received from the machine learning system 602, the prediction system 604 can make a prediction about the feature vector 612 and produce an output 614. The output can include an expected label 714, for example.

Any system described above can include, but is not limited to, a single processor system, a multi-processor system (co-located or distributed), a cloud computing system, or a combination of the above.

Any client device described above can include, but is not limited to, a desktop computer, a laptop computer, a portable computer, a tablet computing device, a smartphone, a feature phone, a personal digital assistant, a media player, an electronic book reader, an entertainment system of a vehicle or the like.

Networks described herein can be wired or wireless networks, and can include, but are not limited to, WiFi networks, local area networks, wide area networks, the Internet, or a combination of the above.

Data storage, memory and/or computer readable media can include a nontransitory storage device such as a magnetic storage device (hard disk drive or the like), optical storage device (CD, DVD or the like), electronic storage device (RAM, ROM, flash, or the like). The software instructions can also be contained in, and provided as, an electronic signal.

Moreover, embodiments of the disclosed method, system, and computer readable media can be implemented in software executed on a programmed general purpose computer, a special purpose computer, a microprocessor, or the like.

It is, therefore, apparent that there is provided in accordance with the presently disclosed subject matter, a method, system, a computer program product and a computer readable media with software for parameter optimization. While this disclosed subject matter has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of the disclosed subject matter.

APPENDIX TO THE SPECIFICATION

Maximum Entropy Problem

Partition functions arise naturally in maximum entropy estimation or minimum relative entropy $$RE(p \parallel h) = \sum_y p(y) \ln \frac{p(y)}{h(y)}$$

estimation as follows $$\min RE(p \| h) \, s.t. \, \Sigma_y p(y) f(y) = 0, \, \Sigma_y p(y) g(y) \ge 0.$$

Therein, $y \in \Omega$, $f: \Omega \mapsto \mathbb{R}^d$ and $g: \Omega \mapsto \mathbb{R}^{d'}$ are arbitrary (non-constant) vector-valued functions over the sample space. The solution distribution $p(y) = h(y) \exp(\theta^T f(y) + \vartheta^T g(y))/Z(\theta, \vartheta)$ is recovered by the dual optimization $$\theta, \vartheta = \underset{\vartheta \geq 0, \theta}{\arg\max} -\ln \sum_y h(y)\exp(\theta^T f(y) + \vartheta^T g(y))$$

where $\theta \in \mathbb{R}^d$ and $\theta \in \mathbb{R}^{d_t}$. These are obtained by minimizing $Z(\theta, \theta)$ or equivalently by maximizing its negative logarithm. Algorithm 1 permits variational maximization of the dual via the quadratic program $$\min_{\vartheta \geq 0, \theta} \frac{1}{2}(\beta - \tilde{\beta})^T \sum (\beta - \tilde{\beta}) + \beta^T \mu$$

where $\beta^T = [\theta^T \vartheta^T]$. Note that any general convex hull of constraints $\beta \in \Lambda \subseteq \mathbb{R}^{d+d_t}$ could be imposed without loss of generality.

Proof 1

Rewrite the partition function as a sum over the integer index $j=1, \ldots, n$ under the random ordering $\pi:\Omega \mapsto \{1, \ldots, n\}$. This defines $j=\pi(y)$ and associates $h$ and $f$ with $h_j=h(\pi^{-1}(j))$ and $f_j=f(\pi^{-1}(j))$. Next, write $Z(\theta)=\Sigma_{j=1}^n \alpha_j \exp(\lambda^T f_j)$ by introducing $\lambda=\theta-\tilde{\theta}$ and $\alpha_j=h_j\exp(\tilde{\theta}^T f_j)$. Define the partition function over only the first $i$ components as $Z_i(\theta)=\Sigma_{j=1}^i \alpha_j \exp(\lambda^T f_j)$. When $i=0$, a trivial quadratic upper bound holds $$Z_0(\theta) \leq z_0 \exp(\tfrac{1}{2}\lambda^T \Sigma_0 \lambda + \lambda^T \mu_0)$$

with the parameters $z_0 \to 0^+$, $\mu_0=0$, and $\Sigma_0=z_0 I$. Next, add one term to the current partition function $Z_1(\theta)=Z_0(\theta)+\alpha_1\exp(\lambda^T f_1)$. Apply the current bound $Z_0(\theta)$ to obtain $$Z_1(\theta) \leq z_0 \exp(\tfrac{1}{2}\lambda^T \Sigma_0 \lambda + \lambda^T \mu_0) + \alpha_1 \exp(\lambda^T f_1).$$

Consider the following change of variables $$u = \sum\nolimits_0^{1/2} \lambda - \sum\nolimits_0^{-1/2} (f_1 - \mu_0)) \gamma = \frac{\alpha_1}{z_0}\exp\left(\frac{1}{2}(f_1-\mu_0)^T \sum\nolimits_0^{-1}(f_1-\mu_0)\right)$$

and rewrite the logarithm of the bound as $$\ln Z_1(\theta) \leq \ln z_0 - \tfrac{1}{2}(f_1-\mu_0)^T \Sigma_0^{-1}(f_1-\mu_0) + \lambda^T f_1 + \ln(\exp(\tfrac{1}{2}\|u\|^2) + \gamma).$$

Apply the technique described in (T. Jebara, "Multitask sparsity via maximum entropy discrimination," JMLR, 12:75-110, 2011) to the last term to get $$\ln Z_1(\theta) \leq \ln z_0 - \frac{1}{2}(f_1-\mu_0)^T \sum\nolimits_0^{-1}(f_1-\mu_0) + \lambda^T f_1 +$$
$$\ln\left(\exp\left(\frac{1}{2}\|v\|^2\right) + \gamma\right) + \frac{v^T(u-v)}{1+\gamma\exp\left(-\frac{1}{2}\|v\|^2\right)} + \frac{1}{2}(u-v)^T(I+\Gamma vv^T)(u-v).$$

Note that $$\Gamma = \frac{\tanh\left(\frac{1}{2}\ln\left(\gamma\exp\left(-\frac{1}{2}\|v\|^2\right)\right)\right)}{2\ln\left(\gamma\exp\left(-\frac{1}{2}\|v\|^2\right)\right)}.$$

The bound is tight when $u=v$. To achieve tightness when $\theta = \tilde{\theta}$ or, equivalently, $\lambda=0$, choose $v = \Sigma_0^{-1/2}(\mu_0 - f_1)$ yielding $$Z_1(\theta) \leq z_1 \exp(\tfrac{1}{2}\lambda^T \Sigma_1 \lambda + \lambda^T \mu_1)$$

where we have $$z_1 = z_0 + \alpha_1 \mu_1 = \frac{z_0}{z_0+\alpha_1}\mu_0 + \frac{\alpha_1}{z_0+\alpha_1}f_1 \sum\nolimits_1 =$$

$$\sum\nolimits_0 + \frac{\tanh\left(\frac{1}{2}\ln(\alpha_1/z_0)\right)}{2\ln(\alpha_1/z_0)}(\mu_0-f_1)(\mu_0-f_1)^T.$$

This rule updates the bound parameters $z_0, \mu_0, \Sigma_0$ to incorporate an extra term in the sum over $i$ in $Z(\theta)$. The process is iterated $n$ times (replacing 1 with $i$ and 0 with $i-1$) to produce an overall bound on all terms.

Proof 2

Begin by upper-bounding (in the Loewner ordering sense) the matrices $\Sigma_j$ in Algorithm 3. Since $\|f_{x_j}(y)\|^2 \leq r$ for all $y \in \Omega_j$ and since $\mu_j$ in Algorithm 1 is a convex combination of $f_{x_j}(y)$, the outer-product terms in the update for $\Sigma_j$ satisfy $$(f_{x_j}(y)-\mu)(f_{x_j}(y)-\mu)^T \circ 4rI.$$

Thus, $\Sigma_j \circ F(\alpha_1, \ldots, \alpha_n) 4rI$ holds where $$F(\alpha_1, \ldots, \alpha_n) = \sum_{i=2}^n \frac{\tanh\left(\frac{1}{2}\ln\left(\frac{\alpha_i}{\sum_{k=1}^{i-1}\alpha_k}\right)\right)}{2\ln\left(\frac{\alpha_i}{\sum_{k=1}^{i-1}\alpha_k}\right)}$$

using the definition of $\alpha_1, \ldots, \alpha_n$ in the proof of Theorem 1. The formula for F starts at $i=2$ since $z_0 \to 0^+$. Assume permutation $\pi$ is sampled uniformly at random. The expected value of F is then $$E_\pi[F(\alpha_1, \ldots, \alpha_n)] = \frac{1}{n!}\sum_\pi \sum_{i=2}^n \frac{\tanh\left(\frac{1}{2}\ln\left(\frac{\alpha_{\pi(i)}}{\sum_{k=1}^{i-1}\alpha_{\pi(k)}}\right)\right)}{2\ln\left(\frac{\alpha_{\pi(i)}}{\sum_{k=1}^{i-1}\alpha_{\pi(k)}}\right)}.$$

We claim that the expectation is maximized when all $\alpha_i=1$ or any positive constant. Also, F is invariant under uniform scaling of its arguments. Write the expected value of F as E for short. Next, consider

$$\frac{\partial E}{\partial \alpha_l}$$

at the setting $\alpha_i=1$, $\forall i$. Due to the expectation over $\pi$, we have $$\frac{\partial E}{\partial \alpha_l} = \frac{\partial E}{\partial \alpha_o}$$

for any $l, o$. Therefore, the gradient vector is constant when all $\alpha_i=1$. Since $F(\alpha_1, \ldots, \alpha_n)$ is invariant to scaling, the gradient vector must therefore be the all zeros vector. Thus, the point when all $\alpha_i=1$ is an extremum or a saddle. Next, consider $$\frac{\partial}{\partial \alpha_o} \frac{\partial E}{\partial \alpha_l}$$

for any $l, o$. At the setting $$\alpha_i = 1, \frac{\partial^2 E}{\partial \alpha_i^2} = -c(n) \text{ and, } \frac{\partial}{\partial \alpha_o}\frac{\partial E}{\partial \alpha_l} = c(n)/(n-1)$$

for some non-negative constant function c(n). Thus, the $\alpha_i=1$ extremum is locally concave and is a maximum. This establishes that $E_\pi[F(\alpha_1, \ldots, \alpha_n)] \leq E_\pi[F(1, \ldots, 1)]$ and yields the Loewner bound $$\sum_j^o \left(2r \sum_{i=1}^{n-1} \frac{\tanh(\ln(i)/2)}{\ln(i)}\right) I = \omega I.$$

Apply this bound to each $\Sigma_j$ in the lower bound on $J(\theta)$ and also note a corresponding upper bound $$J(\theta) \geq J(\tilde{\theta}) - \frac{t\omega + t\lambda}{2}\|\theta - \tilde{\theta}\|^2 - \sum_j (\theta - \tilde{\theta})^T (\mu_j - f_{x_j}(y_j)) J(\theta) \leq J(\tilde{\theta}) - \frac{t\lambda}{2}\|\theta - \tilde{\theta}\|^2 - \sum_j (\theta - \tilde{\theta})^T (\mu_j - f_{x_j}(y_j))$$

which follows from Jensen's inequality. Define the current $\tilde{\theta}$ at time $\tau$ as $\theta_\tau$, and denote by $L_\tau(\theta)$ the above lower bound and by $U_\tau(\theta)$ the above upper bound at time $\tau$. Clearly, $L_\tau(\theta) \leq J(\theta) \leq U_\tau(\theta)$ with equality when $\theta = \theta_\tau$. Algorithm 3 maximizes $J(\theta)$ after initializing at $\theta_0$ and performing an update by maximizing a lower bound based on $\Sigma_j$. Since $L_\tau(\theta)$ replaces the definition of $\Sigma_j$ with $\omega I \pm \Sigma_j$, $L_\tau(\theta)$ is a looser bound than the one used by Algorithm 3. Thus, performing $\theta_{\tau+1} = \arg\max_{\theta \in \Lambda} L_\tau(\theta)$ makes less progress than a step of Algorithm 1. Consider computing the slower update at each iteration $\tau$ and returning $\theta_{\tau+1} = \arg\max_{\theta \in \Lambda} L_\tau(\theta)$. Setting $\Phi = (t\omega + t\lambda)I$, $\Psi = t\lambda I$ and $$\kappa = \frac{\omega + \lambda}{\lambda}$$

allows us to apply Theorem 3 as follows $$\sup_{\theta \in \Lambda} L_\tau(\theta) - L_\tau(\theta_\tau) \geq \frac{1}{\kappa} \sup_{\theta \in \Lambda} U_\tau(\theta) - U_\tau(\theta_\tau).$$

Since $L_\tau(\theta_\tau) = J(\theta_\tau) = U_\tau(\theta_\tau)$, $J(\theta_{\tau+1}) \geq \sup_{\theta \in \Lambda} L_\tau(\theta)$ and $\sup_{\theta \in \Lambda} U_\tau(\theta) \geq J(\theta^*)$, we obtain $$J(\theta_{\tau+1}) - J(\theta^*) \geq \left(1 - \frac{1}{\kappa}\right)(J(\theta_\tau) - J(\theta^*)).$$

Iterate the above inequality starting at t=0 to obtain $$J(\theta_\tau) - J(\theta^*) \geq \left(1 - \frac{1}{\kappa}\right)^\tau (J(\theta_0) - J(\theta^*)).$$

A solution within a multiplicative factor of $\epsilon$ implies that $$\varepsilon = \left(1 - \frac{1}{\kappa}\right)^\tau \text{ or } \ln(1/\varepsilon) = \tau \ln\frac{\kappa}{\kappa - 1}.$$

Inserting the definition for $\kappa$ shows that the number of iterations $\tau$ is at most $$\left\lceil \frac{\ln(1/\varepsilon)}{\ln\frac{\kappa}{\kappa-1}} \right\rceil \text{ or } \left\lceil \frac{\ln(1/\varepsilon)}{\ln(1+\lambda/\omega)} \right\rceil.$$

Inserting the definition for $\omega$ gives the bound.

Theorem 3

If $\kappa\Psi \pm \Phi > 0$ for $\Phi, \Psi \in \mathbb{R}^{d \times d}$, then $$L(\theta) = -\tfrac{1}{2}(\theta - \tilde{\theta})^T \Phi(\theta - \tilde{\theta}) - (\theta - \tilde{\theta})^T \mu U(\theta) = -\tfrac{1}{2}(\theta - \tilde{\theta})^T \Psi(\theta - \tilde{\theta}) - (\theta - \tilde{\theta})^T \mu$$

satisfy $$\sup_{\theta \in \Lambda} L(\theta) \geq \frac{1}{\kappa} \sup_{\theta \in \Lambda} U(\theta)$$

for any convex $\Lambda \subseteq \mathbb{R}^d$, $\tilde{\theta} \in \Lambda$, $\mu \in \mathbb{R}^d$ and $\kappa \in \mathbb{R}^+$.

Proof 3

Define the primal problems of interest as $P_L = \sup_{\theta \in \Lambda} L(\theta)$ and $P_U = \sup_{\theta \in \Lambda} U(\theta)$. The constraints $\theta \in \Lambda$ can be summarized by a set of linear inequalities $A\theta \leq b$ where $A \in \mathbb{R}^{kd}$ and $b \in \mathbb{R}^k$ for some (possibly infinite) $k \in \mathbb{Z}$. Apply the change of variables $z = \theta - \tilde{\theta}$. The constraint $A(z + \tilde{\theta}) \leq b$ simplifies into $Az \leq \bar{b}$ where $\bar{b} = b - A\tilde{\theta}$. Since $\tilde{\theta} \in \Lambda$, it is easy to show that $\bar{b} \geq 0$. We obtain the equivalent primal problems $P_L = \sup_{Az \leq \bar{b}} -\tfrac{1}{2}z^T \Phi z - z^T \mu$ and $P_U = \sup_{Az \leq \bar{b}} -\tfrac{1}{2}z^T \Psi z - z^T \mu$. The corresponding dual problems are $$D_L = \inf_{y \geq 0} \frac{y^T A \Phi^{-1} A^T y}{2} + y^T A \Phi^{-1} \mu + y^T \bar{b} + \frac{\mu^T \Phi^{-1} \mu}{2}$$

$$D_U = \inf_{y \geq 0} \frac{y^T A \Psi^{-1} A^T y}{2} + y^T A \Psi^{-1} \mu + y^T \bar{b} + \frac{\mu^T \Psi^{-1} \mu}{2}.$$

Due to strong duality, $P_L = D_L$ and $P_U = D_U$. Apply the inequalities $\Phi \circ \kappa\Psi$ and $y^T \bar{b} > 0$ as $$P_L \geq \sup_{Az \leq \bar{b}} -\frac{\kappa}{2} z^T \Psi z - z^T \mu = \inf_{y \geq 0} \frac{y^T A \Psi^{-1} A^T y}{2\kappa} + \frac{y^T A \Psi^{-1} \mu}{\kappa} + y^T \bar{b} + \frac{\mu^T \Psi^{-1} \mu}{2\kappa} \geq \frac{1}{\kappa} D_U = \frac{1}{\kappa} P_U.$$

This proves that $$P_L \geq \frac{1}{\kappa} P_U.$$

Theorem 4

For all $u \in \mathbb{R}^d$, ln $$\left(\exp\left(\frac{1}{2}\|u\|^2\right) + \gamma\right) \leq$$

$$\ln\left(\exp\left(\frac{1}{2}\|v\|^2\right) + \gamma\right) + \frac{v^T(u-v)}{1+\gamma\exp\left(-\frac{1}{2}\|v\|^2\right)} + \frac{1}{2}(u-v)^T(I + \Gamma vv^T)(u-v)$$

when the scalar term $$\Gamma = \frac{\tanh\left(\frac{1}{2}\ln(\gamma\exp(-\|v\|^2/2))\right)}{2\ln(\gamma\exp(-\|v\|^2/2))}.$$

The bound holds for any $\gamma \geq 0$ and $v \in \mathbb{R}^d$. Strict equality is achieved when $u = v$.

---

Algorithm 5

Input $\tilde{\theta}$, $h_1^{2,0}$, $f_1^{2,0}$ and $z_{c^{1,1}}$, $\Sigma_{c^{1,1}}$, $\mu_{c^{1,1}}$ $\forall c^{1,1} = 1, \ldots, m_{1,1}$
Init $z \to 0^+$, $\mu = 0$, $\Sigma = zI$
For each configuration $Y_1^{2,0}$ {
$\quad \alpha = h_1^{2,0}(\Pi_{c^{1,1}=1}^{m_{1,1}} z_{c^{1,1}} \exp(-\tilde{\theta}^T\mu_{c^{1,1}}))(-\tilde{\theta}^T(f_1^{2,0} + \Sigma_{c^{1,1}=1}^{m_{1,1}}\mu_{c^{1,1}}))$ $\quad = h_1^{2,0}\exp(\tilde{\theta}^T f_1^{2,0})\prod_{c^{1,1}=1}^{m_{1,1}} z_{c^{1,1}}$ $\quad l = f_1^{2,0} + \Sigma_{c^{1,1}=1}^{m_{1,1}}\mu_{c^{1,1}} - \mu$ $\quad \sum += \sum_{c^{1,1}=1}^{m_{1,1}} \sum_{c^{1,1}} + \frac{\tanh\left(\frac{1}{2}(\alpha/z)\right)}{2\ln(\alpha/z)} ll^T$ $\quad \mu += \frac{\alpha}{z+\alpha} l$ $\quad z += \alpha$ }
Output $z$, $\mu$, $\Sigma$

---

Proof of Correctness of Algorithm 3

Figure 8:
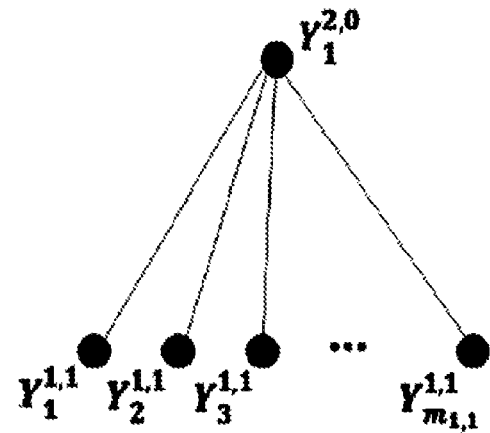
FIG. 8 is a diagram of an example junction tree of depth 2.

Consider a simple junction tree of depth 2 (see, e.g., FIG. 8). The notation $Y_c^{a,b}$ refers to the $c^{th}$ tree node located on depth $a$, which has a parent $b$ (for the root $b=0$). Note we assume the depth level of the tree increases moving from the leaves to the root.

$$\sum_{Y_{c_1}^{a_1,b_1}}$$

refers to the sum over all configurations of variables in $$Y_{c_1}^{a_1,b_1} \text{ and } \sum_{Y_{c_1}^{a_1,b_1}\setminus Y_{c_2}^{a_2,b_2}}$$

refers to the sum over all configurations of variables that are in $Y_{c_1}^{a_1,b_1}$ but not in $Y_{c_2}^{a_2,b_2}$. The notation seems to be too complex for such small tree, but is should be clear that it can be directly applied to larger trees therefore we will further use it. To simplify the notation a little let: $h_{c_1}^{a_1,b_1} = h_{c_1}^{a_1,b_1}(Y_{c_1}^{a_1,b_1})$, $f_{c_1}^{a_1,b_1} = f_{c_1}^{a_1,b_1}(Y_{c_1}^{a_1,b_1})$ and $\psi_{c_1}^{a_1,b_1} = \psi_{c_1}^{a_1,b_1}(Y_{c_1}^{a_1,b_1}) = h_{c_1}^{a_1,b_1}(Y_{c_1}^{a_1,b_1})\exp(\theta^T f_{c_1}^{a_1,b_1}(Y_{c_1}^{a_1,b_1}))$. The partition function can be expressed as:

$$Z(\theta) = \sum_{Y_1^{2,0}} \left[\psi_1^{2,0}\Pi_{c^{1,1}=1}^{m_{1,1}}\left(\sum_{Y_{c^{1,1}}^{1,1}\setminus Y_1^{2,0}} \psi_{c^{1,1}}^{1,1}\right)\right] \leq$$

$$\sum_{Y_1^{2,0}} \left[\psi_1^{2,0}\Pi_{c^{1,1}=1}^{m_{1,1}} z_{c^{1,1}} \exp\left(\frac{1}{2}(\theta-\tilde{\theta})^T\sum_{c^{1,1}}(\theta-\tilde{\theta}) + (\theta-\tilde{\theta})^T\mu_{c^{1,1}}\right)\right] =$$

$$\sum_{Y_1^{2,0}} \left[h_1^{2,0}\exp(\theta^T f_1^{2,0})\Pi_{c^{1,1}=1}^{m_{1,1}} z_{c^{1,1}}\right.$$

$$\left.\exp\left(\frac{1}{2}(\theta-\tilde{\theta})^T\sum_{c^{1,1}}(\theta-\tilde{\theta}) + (\theta-\tilde{\theta})^T\mu_{c^{1,1}}\right)\right]$$

where the upperbound comes from applying Theorem 1 to each of the terms:

$$\sum_{Y_{c^{1,1}}^{1,1}\setminus Y_1^{2,0}} \psi_{c^{1,1}}^{1,1}.$$

To explain the notation that will be further used, $m_{a,b}$ denotes the number of children of $b^{th}$ node situated on depth $a+1$.

Finally, by simply rearranging terms we get:

$$Z(\theta) \leq \sum_{Y_1^{2,0}} \left[\begin{array}{l} h_1^{2,0}\left(\prod_{c^{1,1}=1}^{m_{1,1}} z_{c^{1,1}}\exp(-\tilde{\theta}^T\mu_{c^{1,1}})\right) \\ \exp\left(\theta^T\left(f_1^{2,0} + \sum_{c^{1,1}=1}^{m_{1,1}}\mu_{c^{1,1}}\right)\right) \\ \exp\left(\frac{1}{2}(\theta-\tilde{\theta})^T(\sum_{c^{1,1}=1}^{m_{1,1}}\Sigma_{c^{1,1}})(\theta-\tilde{\theta})\right) \end{array}\right]$$

One can prove that this expression can be upperbounded by the expression of the form: $z\exp(\frac{1}{2}(\theta-\hat{\theta})^T\Sigma(\theta-\hat{\theta})+(\theta-\hat{\theta})^T\mu)$ where $z$, $\Sigma$ and $\mu$ can be computed using Algorithm 5 (notice it is nothing more than just Algorithm 3 for this simple junction tree that we consider). We will call this result Lemma 1. The proof is a mirror analogy of Proof 1 and so we do not provide it.

Figure 9:
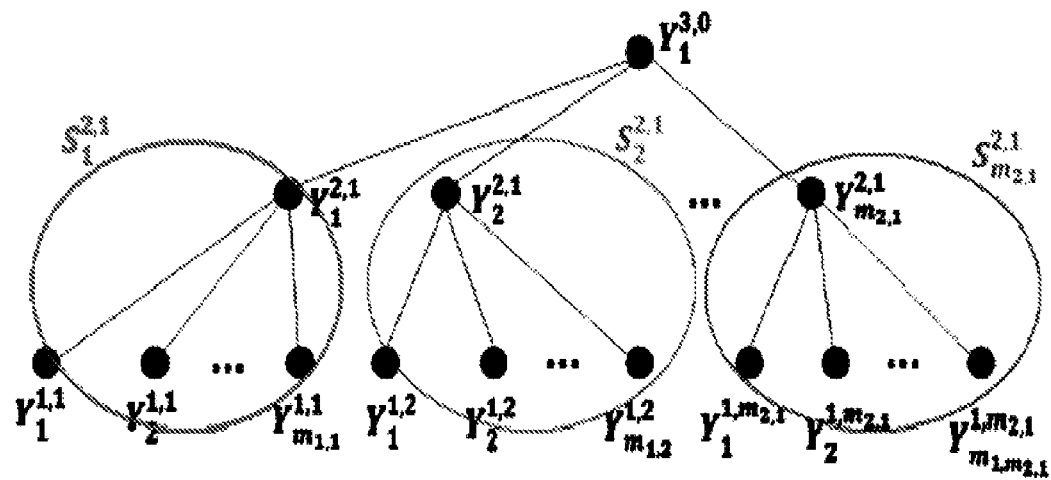
FIG. 9 is a diagram of an example junction tree of depth 3.

Consider enlarging the previously discussed example tree to a tree of depth 3 (See, e.g., FIG. 9). The partition function can now be expressed as:

$$Z(\theta) = $$

$$\sum_{Y_1^{3,0}} \left[\psi_1^{3,0}\Pi_{c^{2,1}=1}^{m_{2,1}}\left(\sum_{Y_{c^{2,1}}^{2,1}\setminus Y_1^{3,0}}\left(\psi_{c^{2,1}}^{2,1}\Pi_{c^{1,1}=1}^{m_{1,c^{2,1}}}\left(\sum_{Y_{c^{1,c^{2,1}}}^{1,c^{2,1}}\setminus Y_{c^{2,1}}^{2,1}} \psi_{c^{1,c^{2,1}}}^{1,c^{2,1}}\right)\right)\right)\right]$$

By Lemma 1 we can upper bound each of the terms of the form:

$$\sum_{c^{2,1}} Y^{2,1} \psi_1^{3,0} \left( \psi_{c^{2,1}}^{2,1} \prod_{c^{1,c^{2,1}}=1}^{m_{1,c^{2,1}}} \left( \sum_{Y^{1,c^{2,1}}} \psi_{c^{1,c^{2,1}}}^{1,c^{2,1}} \psi_{c^{1,c^{2,1}}}^{1,c^{2,1}} \right) \right)$$

by the expressions of the form: $z_{c^{2,1}} \exp(\frac{1}{2}(\theta-\hat{\theta})^T \Sigma_{c^{2,1}}(\theta-\hat{\theta}) + (\theta-\hat{\theta})^T \mu_{c^{2,1}})$ yielding:

$$Z(\theta) \leq \Sigma_{Y_1^{3,0}}[\psi_1^{3,0} \Pi_{c^{2,1}=1}^{m_{2,1}} z_{c^{2,1}} \exp(\frac{1}{2}(\theta-\hat{\theta})^T \Sigma_{c^{2,1}}(\theta-\hat{\theta}) + (\theta-\hat{\theta})^T \mu_{c^{2,1}})]$$

This process can be viewed as collapsing the subtrees $S_1^{2,1}$, $S_2^{2,1}, \ldots, S_{m_{2,1}}^{2,1}$ to supernodes that are represented by bound parameters: $z_{c^{2,1}}$, $\Sigma_{c^{2,1}}$ and $\mu_{c^{2,1}}$. Notice that the obtained expression can be further upper bounded using again Lemma 1 (induction) yielding the bound of the form: $z\exp(\frac{1}{2}(\theta-\hat{\theta})^T \Sigma(\theta-\hat{\theta}) + (\theta-\hat{\theta})^T \mu)$. Also, notice this procedure yields nothing more than just Algorithm 5 for this junction tree that we consider.

The partition function of a general junction tree of depth p can be expressed as:

$$Z(\theta) = \sum_{Y_1^{p,0}} \left[ \psi_1^{p,0} \prod_{c^{p-1,1}=1}^{m_{p-1,1}} \left( \sum_{Y^{p-1,1}} \psi_1^{p-1,1} \psi_{c^{p-1,1}}^{p-1,1} \prod_{c^{p-2,c^{p-1,1}}}^{m_{p-2,c^{p-1,1}}} \left( \sum_{Y^{p-2,c^{p-1,1}}} \psi_{c^{p-1,1}}^{p-1,1} \left( \psi_{c^{p-2,c^{p-1,1}}}^{p-2,c^{p-1,1}} \cdots \right) \right) \right) \right]$$

It should now be clear that for this 'general' tree, one can follow exactly the same steps as described before, start from leaves and collapse nodes to supernodes, each represented by bound parameters. It yields Algorithm 5. We do not provide a formal induction proof to avoid using complex notation.

Proof of Correctness of Algorithm 4

We begin by proving a theorem that will be useful later.
Theorem 5

For all $x \in \mathbb{R}^d$ and for all $l \in \mathbb{R}^d$:

$$\sum_{i=1}^{d} x(i)^2 l(i)^2 \geq \left( \sum_{i=1}^{d} x(i) \frac{l(i)^2}{\sqrt{\sum_{j=1}^{d} l(j)^2}} \right)^2$$

Proof 5
By Jensen's inequality:

$$\sum_{i=1}^{d} x(i)^2 \frac{l(i)^2}{\sum_{j=1}^{d} l(j)^2} \geq \left( \sum_{i=1}^{d} x(i) \frac{l(i)^2}{\sum_{j=1}^{d} l(j)^2} \right)^2 \Leftarrow$$

$$\sum_{i=1}^{d} x(i)^2 l(i)^2 \geq \left( \sum_{i=1}^{d} x(i) \frac{l(i)^2}{\sqrt{\sum_{j=1}^{d} l(j)^2}} \right)^2$$

At $i^{th}$ iteration we store $M_i$ using a low-rank representation $V_i^T S_i V_i + D_i$ where $V_i \in \mathbb{R}^{k \times d}$ is orthonormal, $S_i \in \mathbb{R}^{k \times k}$ is non-positive diagonal and $D_i \in \mathbb{R}^{d \times d}$ is non-negative diagonal (each diagonal term of $D_1$ (initialization) is set to $1/t\lambda$ where $\lambda$ is the regularization term). We consider decrementing the matrix by a rank one update of the form $M_i = M_{i-1} - r_i r_i^T$. By projecting $r_i$ onto each eigenvector in V, we can decompose $r_i$ as: $r_i = \Sigma_{j=1}^{k} V_{i-1}(j, \bullet) r_i V_{i-1}(j, \bullet)^T + \text{res} = V_{i-1}^T V_{i-1} r_i + \text{res}$. Thus the update rule can be rewritten as:

$$M_i = M_{i-1} - r_i r_i^T$$
$$= V_{i-1}^T S_{i-1} V_{i-1} + D_{i-1} - (V_{i-1}^T V_{i-1} r_i + \text{res})$$
$$(V_{i-1}^T V_{i-1} r_i + \text{res})^T$$
$$= V_{i-1}^T (S_{i-1} - V_{i-1} r_i r_i^T V_{i-1}^T) V_{i-1} + D_{i-1} - \text{res res}^T$$
$$= V_{i-1}^T S_{i-1}' V_{i-1} + D_{i-1} - \text{res res}^T$$

where $S_{i-1}' = S_{i-1} - V_{i-1} r_i r_i^T V_{i-1}^T$

Notice that $S_{i-1}'$ can only have nonpositive entrances since S is initialized by a matrix of all zeros and then it is updated by subtracting nonnegative values from its diagonal.

By discarding the smallest singular value and its corresponding eigenvector, one ends up with matrix $M_i'$ of one of the following form:
1) If res was discarded:

$$M_i' = V_{i-1}^T S_{i-1}' V_{i-1} + D_{i-1} = M_i + \text{res res}^T = M_i + cvv^T$$

where c=1 and v=res
2) Otherwise, if $m^{th}$ eigenvector was discarded:

$$M_i' = V_{i-1}^T S_{i-1}' V_{i-1} + D_{i-1} - \text{res res}^T - S'(m, m) V(m, \bullet)^T V(m, \bullet)$$
$$= M_i - S'(m, m) V(m, \bullet)^T V(m, \bullet)$$
$$= M_i + cvv^T$$

where $c = -S'(m, m)$ and $v = V(m, \bullet)$

Notice that both cases can be combined using the notation: $M_i' = M_i + cvv^T$ where $c \geq 0$ (since $c = -S'(m, m)$ can only be nonnegative).

By discarding the smallest singular value and its corresponding eigenvector we violate the bound. Alternatively, instead of discarding, we can absorb those terms into a diagonal component, satisfying the bound. Formally, we look for diagonal matrix F such that $M_i'' = M_i' - F$ and for all $x \in \mathbb{R}^d$: $x^T \Sigma_i'' x \geq x^T \Sigma_i x$ where $\Sigma_i = M_i^{-1}$ and $\Sigma_i'' = M_i''^{-1}$. Thus, we want to satisfy:

$$x^T \Sigma_i'' x \geq x^T \Sigma_i x \Leftarrow x^T M_i''^{-1} x \geq x^T M_i^{-1} x \Leftarrow x^T (M_i' - F)^{-1} x \geq x^T M_i^{-1} x$$

$$\Leftarrow x^T (M_i + cvv^T - F)^{-1} x \geq x^T M_i^{-1} x$$

From positive definiteness (throughout all iterations positive definiteness can be satisfied by the proper choice of $\lambda$ while initializing $D_1$, notice that to break positive definiteness in any iteration one would have to set $\lambda$ to a very large value in the initialization, i.e. 1e23, which obviously is unreasonable in practice) it is equivalent to satisfy:

$$x^T (M_i + cvv^T - F) x \geq x^T M_i x \Leftarrow x^T cvv^T x \geq x^T F x \Leftarrow c(\Sigma_{i=1}^{d} x(i) v(i))^2 \leq \Sigma_{i=1}^{d} x(i)^2 F(i)$$

where for the ease of notation F(i)=F(i, i).

Let $$\forall_{i=1,\ldots,d}\; v(i)' = \frac{v(i)}{W} \text{ where } W = \sum_{j=1}^{d} v(j).$$

Let also for now assume that $\forall_{i=1,\ldots,d}\, v(i) \geq 0$. We will very soon get rid of this assumption. Thus we look for F such that:
$\Sigma_{i=1}^{d} x(i)^2 F(i) \geq c(\Sigma_{i=1}^{d} x(i) Wv(i)')^2 \Leftarrow \Sigma_{i=1}^{d} x(i)^2 F(i) \geq cW^2 (\Sigma_{i=1}^{d} x(i)v(i)')^2 \Leftarrow$ $$\sum_{i=1}^{d} x(i)^2 \frac{F(i)}{cW^2} \geq \left(\sum_{i=1}^{d} x(i)v(i)'\right)^2.$$

Let $$\forall_{i=1,\ldots,d}\; F(i)' = \frac{F(i)}{cW^2}.$$

Thus we look for F' such that: $\Sigma_{i=1}^{d} x(i)^2 F(i)' \geq (\Sigma_{i=1}^{d} x(i)v(i)')^2$. By Theorem 5 one can easily show that the solution is $F'=v(i)'$ (simply substitute $l(i)=\sqrt{v(i)'}$ and keep in mind $\Sigma_{j=1}^{d} v(j)'=1$). Thus:

$$F(i)' = v(i)' = \frac{v(i)}{W}.$$

Finally, $$F(i) = cW^2 F(i)' = cW^2 \frac{v(i)}{W} = cWv(i) = cv(i) \sum_{j=1}^{d} v(j).$$

Thus for all $x \in \mathbb{R}^d$ and for all $x \in \mathbb{R}^d$ such that $\forall i=1,\ldots,d: v(i) \geq 0$ and for $F(i)=cv(i)\Sigma_{j=1}^{d}v(j)$ the following inequality holds:

$$\Sigma_{i=1}^{d} x(i)^2 F(i) \geq c(\Sigma_{i=1}^{d} x(i)v(i))^2 \quad (3)$$

To generalize the inequality to hold for all vectors $v \in \mathbb{R}^d$ (also with negative entrances), it is sufficient to set $F(i)=c|v(i)|\Sigma_{j=1}^{d}|v(j)|$. To see it consider flipping the sign of any $v(i)$, the left side of the Inequality 3 does not change. For the right side of this inequality, flipping the sign of $v(i)$ is equivalent to flipping the sign of $x(i)$ and not changing the sign of $v(i)$, but in this case the inequality holds as proven before (it holds for any $x \in \mathbb{R}^d$). Thus for all $x \in \mathbb{R}^d$ and for all $v \in \mathbb{R}^d$ and for $F(i)=c|v(i)|\Sigma_{j=1}^{d}|v(j)|$, Inequality 3 holds.

What is claimed is:

1. A system for optimizing parameters of a structured prediction model, the system comprising:
   a computer-readable medium;
   a parameter optimization processor coupled to the computer-readable medium; and
   a communication interface coupled to the parameter optimization processor and adapted to receive and transmit electronic representations of structured prediction models to and from the parameter optimization processor, respectively,
   the computer-readable medium having stored thereon software instructions that, when executed by the parameter optimization processor, cause the parameter optimization processor to perform operations including:
   initializing a group of parameters to respective values corresponding to a state within a set of allowable structured prediction models;
   bounding a partition function across a number of variable pairs to generate a plurality of bounds each being a quadratic upper bound on a partition function;
   determining new values for the group of parameters that minimize a sum of the plurality of bounds;
   setting the group of parameters to the new values;
   optimizing the parameters by iteratively performing the bounding, determining and setting; and
   stopping the optimizing when a termination condition is reached.

2. The system of claim 1, wherein the bounding includes updating a partition function value, a gradient and a curvature of the quadratic upper bound.

3. The system of claim 1, wherein the termination condition includes determining that a difference between a conditional likelihood based on the current parameters and a previous conditional likelihood based on previous parameters is less than a predetermined value.

4. The system of claim 1, wherein the termination condition includes determining that a difference between a current set of parameters and a previous set of parameters is less than a predetermined threshold value.

5. The system of claim 1, wherein the termination condition includes performing a predetermined number of iterations.

6. The system of claim 1, wherein the termination condition includes performing the bounding, determining and setting for a predetermined period of time.

7. The system of claim 1, wherein the set of allowable models forms a convex hull.

8. The system of claim 1, wherein each variable pair includes an observed input value and an observed output value.

9. The system of claim 1, wherein each variable pair includes a first sample and a second sample from an unknown distribution.

10. The system of claim 1, wherein the structured prediction model includes one of a deep belief network, a machine learning model, a pattern recognition model, a shallow parsing model, a named entity recognition model, a gene finding model, an object recognition model and an image segmentation model.

11. A computerized method for optimizing parameters for a structured prediction system, the method comprising:
   initializing a group of parameters to respective values corresponding to a state within a set of allowable models;
   bounding a partition function across a number of variable pairs to generate a plurality of bounds, wherein the bounding includes computing a quadratic upper bound on the partition function;
   determining new values for the group of parameters that minimize a sum of the plurality of bounds;
   setting the group of parameters to the new values;
   optimizing the parameters by iteratively performing the bounding, determining and setting; and
   stopping the optimizing when a termination condition is reached.

12. The method of claim 11, wherein the bounding includes updating a partition function value, a gradient and a curvature of the quadratic upper bound.

13. The method of claim 11, wherein the termination condition includes determining that a difference between a conditional likelihood based on the current parameters and a previous conditional likelihood based on previous parameters is less than a predetermined value.

14. The method of claim 11, wherein the termination condition includes determining that a difference between a current set of parameters and a previous set of parameters is less than a predetermined threshold value.

15. The method of claim 11, wherein the termination condition includes performing a predetermined number of iterations.

16. The method of claim 11, wherein the termination condition includes performing the bounding, determining and setting for a predetermined period of time.

17. The method of claim 11, wherein the set of allowable models forms a convex hull.

18. The method of claim 11, wherein each variable pair includes an observed input value and an observed output value.

19. The method of claim 11, wherein each variable pair includes a first sample and a second sample from an unknown distribution.

20. The method of claim 11, wherein the structured prediction system includes one of a machine learning system, a pattern recognition system, a shallow parsing system, a named entity recognition system, a gene finding system, an object recognition system and an image segmentation system.

21. The method of claim 11, wherein the bounding includes:
   providing a graphical model arranged as a junction tree;
   computing bounds for a set of variables that a clique of the junction tree has in common with a parent clique of the clique;
   collecting pre-computed bounds from child cliques of the clique;
   updating quadratic bound variables for the clique based on the computed bounds and the collected pre-computed bounds;
   terminating the updating when a root clique is reached; and
   outputting a curvature of a partition function bound, a partition function value and a gradient,
   wherein the computing, collecting and updating are performed recursively beginning with leaf cliques of the junction tree and progressing toward root cliques.

22. The method of claim 11, wherein the bounding includes:
   computing a partition function value;
   computing a gradient vector for a number of indices; and
   computing a curvature of a bound, wherein the curvature is stored as a group of low rank matrices including a first matrix having singular values, a second matrix having eigenvectors and a third matrix being a diagonal matrix.

23. A computerized method for optimizing parameters for a structured prediction system, the method comprising:
   initializing a group of parameters to respective values corresponding to a state within a set of allowable models;
   bounding a partition function, wherein the bounding includes one or more of:
   a) computing a quadratic upper bound on the partition function;
   b) iteratively computing upper bounds on the partition function and selecting parameters to minimize a sum of the bounds;
   c) computing a partition function bound for a latent likelihood model;
   d) computing a partition function bound for a graphical model; and
   e) computing a partition function bound for a high dimensional model using a plurality of matrices to represent a curvature of the partition function bound;
   determining new values for the group of parameters based on the bounding;
   setting the group of parameters to the new values;
   optimizing the parameters by iteratively performing the bounding, determining and setting; and
   stopping the optimizing when a termination condition is reached.

24. The method of claim 23, wherein the optimizing converges monotonically.

25. The method of claim 23, wherein the optimizing converges monotonically when the bounding includes computing a partition function bound for a latent likelihood model.

* * * * *

UNITED STATES PATENT AND TRADEMARK OFFICE
CERTIFICATE OF CORRECTION

PATENT NO. : 8,832,000 B2  
APPLICATION NO. : 13/491426  
DATED : September 9, 2014  
INVENTOR(S) : Tony Jebara Page 1 of 1

It is certified that error appears in the above-identified patent and that said Letters Patent is hereby corrected as shown below:

On the Title Page, Item (54) and in the Specification, Column 1, Line 1, in the title "DEVICE" should be changed to --DEVICES--.

Signed and Sealed this
Sixteenth Day of December, 2014

Michelle K. Lee
*Deputy Director of the United States Patent and Trademark Office*